US011179635B2

(12) United States Patent
Platt et al.

(10) Patent No.: US 11,179,635 B2
(45) Date of Patent: Nov. 23, 2021

(54) SOUND LOCALIZATION IN AN AUGMENTED REALITY VIEW OF A LIVE EVENT HELD IN A REAL-WORLD VENUE

(71) Applicant: Sony Interactive Entertainment LLC, San Mateo, CA (US)

(72) Inventors: Stuart Platt, San Mateo, CA (US); Mohammed Khan, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 564 days.

(21) Appl. No.: 15/730,403

(22) Filed: Oct. 11, 2017

(65) Prior Publication Data

US 2019/0105568 A1   Apr. 11, 2019

(51) Int. Cl.
*A63F 13/54* (2014.01)
*H04S 7/00* (2006.01)
*A63F 13/52* (2014.01)
*A63F 13/35* (2014.01)
*A63F 13/25* (2014.01)
(Continued)

(52) U.S. Cl.
CPC ............. *A63F 13/54* (2014.09); *A63F 13/25* (2014.09); *A63F 13/35* (2014.09); *A63F 13/52* (2014.09); *G06T 19/006* (2013.01); *H04S 7/301* (2013.01); *H04S 7/304* (2013.01); *H04S 7/307* (2013.01); *H04R 27/00* (2013.01); *H04R 2227/003* (2013.01); *H04S 3/008* (2013.01); *H04S 7/306* (2013.01); *H04S 2400/11* (2013.01); *H04S 2400/15* (2013.01)

(58) Field of Classification Search
CPC .......... A63F 13/54; A63F 13/25; A63F 13/35; A63F 13/52; H04S 7/301; H04S 7/304; H04S 7/307; G06T 19/006
See application file for complete search history.

(56) References Cited

U.S. PATENT DOCUMENTS

| | | | | |
|---|---|---|---|---|
| 5,736,982 A | * | 4/1998 | Suzuki | ............. G06T 15/30 |
| | | | | 348/E7.083 |
| 2010/0150359 A1 | * | 6/2010 | KnicKrehm | ........... G01H 7/00 |
| | | | | 381/58 |

(Continued)

OTHER PUBLICATIONS

Naef et al, "Spatialized Audio Rendering for Immersive Virtual Environments", Nov. 11-13, 2002, ACM, VRST '02: Proceedings of the ACM symposium on Virtual reality software and technology, pp. 65-72 (Year: 2002).*

*Primary Examiner* — Nicholas T Corbo
(74) *Attorney, Agent, or Firm* — Penilla IP, APC

(57) ABSTRACT

A method for localizing sound when enabling participation in a live event, including establishing a multi-player gaming session of a gaming application that generates an interactive gaming world, the live event being a real-world venue where players playing the gaming application are present. A live view of the venue is generated based on captured video streams, and generated for a physical POV anchored to a physical location in the venue. Audio is generated for the live event, and modified to reflect acoustics of the real-world venue for the physical location. The modified audio is synchronized to the live view. The live view and synchronized audio are streamed to an HMD of a remote user located outside the venue, and presents an augmented reality view of the live event.

23 Claims, 21 Drawing Sheets

(51) Int. Cl.
  *G06T 19/00* (2011.01)
  *H04S 3/00* (2006.01)
  *H04R 27/00* (2006.01)

(56) References Cited

U.S. PATENT DOCUMENTS

2015/0312520 A1* 10/2015 Nohria ................... G09B 5/06
                                                                434/350
2017/0157512 A1*  6/2017 Long ..................... A63F 13/497
2017/0264936 A1*  9/2017 Depies ................... G06F 3/012
2017/0365102 A1* 12/2017 Huston .............. H04N 5/23238

* cited by examiner

SOUND LOCALIZATION IN AN AUGMENTED REALITY VIEW OF A LIVE EVENT HELD IN A REAL-WORLD VENUE

TECHNICAL FIELD

The present disclosure is related to electronic sports (eSports) and its supporting technologies.

BACKGROUND OF THE DISCLOSURE

Video games and their related industries (e.g., video gaming) represent a large percentage of the worldwide entertainment market, with some projections having video game global revenues exceeding revenue from the movie industry in the near future. The kids growing up playing video games are now adults (young and old) influencing where their entertainment moneys are to be spent—in the world of video game entertainment.

Video games are played anywhere and at any time using various types of platforms, including gaming consoles, desktop computers, laptop computers, mobile phones, etc. Once a niche market directed to a small number of children and young adults, video games have become increasingly popular across generations, and over time has become an important part of popular culture.

A new dawn of video games is emerging in the form of eSports, otherwise known and described by competitive video gaming or professional video gaming In the world of eSports, professional gamers gather in an arena to play a video game, typically in a multiplayer online game (MOG) format that is supported through a local area network or internet. Individuals or teams of individuals battle it out live in the eSports arena in front of a live audience, where a broadcasting team injects energy and excitement while giving play-by-play of the action within the MOG. A video production team is working frantically backstage projecting views into the gaming environment of the MOG onto arena sized video display panels so that the audience is able to watch the action within the MOG, as viewed and experienced by the professional video garners. Also, live cameras that are focused on the audience or the professional garners may project onto the arena video display panels, as directed by the video production team, to further excite the audience. The live audience participates in a live event, not unlike those attending a traditional professional sporting event (e.g., basketball, baseball, football, boxing, mixed-martial arts, etc.).

In addition, the views presented on the video display panels as generated by the video production team may be live streamed to a wider audience over any network, such as broadcast, internet, mobile, etc. While the live audience may number in the thousands (30+thousand), the streaming audience can number in the millions (e.g., 30+million). For a video game having over 90 million casual garners, a world championship featuring that video game will attract millions of streaming viewers, both in the live format as well as post event viewing. To give a sense of the popularity of an eSports event, a world championship held in 2016 drew a live audience of approximately forty thousand, and a live streaming audience of over twenty-five million. The game play of the professional garners continued to be viewed even after the live event was completed.

Various technologies supporting eSports are being developed to give the live and remote audience the best viewing experience.

It is in this context that embodiments of the disclosure arise.

SUMMARY

Embodiments of the present disclosure relate to systems and methods for generating a live view that is augmented with digital data to provide an augmented reality experience of a live event held at a real-world venue, and providing audio generated for the live event that is localized to a particular viewing location in the real-world venue. Several inventive embodiments of the present disclosure are described below.

In one embodiment, a method for localizing sound when enabling participation in a live event is described. The method includes establishing a multi-player gaming session controlled by a plurality of players through execution of a gaming application at a server, the multi-player gaming session generating an interactive gaming world within which player participation is enabled, the live event being a real-world venue where the plurality of players is present. The method includes generating at the server a three dimensional (3D) live view of the real-world venue based on one or more captured video streams, the 3D live view generated for a first physical point-of-view (POV) of the live event, wherein the first physical POV is anchored to a first physical location in the real-world venue. The method includes generating audio of the live event based on one or more captured audio streams of the live event, the audio being broadcasted over a plurality of sound sources arranged throughout the real-world venue. The method includes modifying the audio to reflect acoustics of the real-world venue for the first physical location. The method includes synchronizing the audio that is modified to the 3D live view. The method includes streaming the live view and audio that is synchronized and modified via a network to a head mounted display (HMD) of a first remote user for display, the first remote user being located outside of the real-world venue, the live view and audio that are streamed presenting a first augmented reality view of the live event to the first remote user through the HMD.

In another embodiment, a non-transitory computer-readable medium storing a computer program for localizing sound when enabling participation in a live event is described. The computer-readable medium includes program instructions for establishing a multi-player gaming session controlled by a plurality of players through execution of a gaming application at a server, the multi-player gaming session generating an interactive gaming world within which player participation is enabled, the live event being a real-world venue where the plurality of players is present. The computer-readable medium includes program instructions for generating at the server a three dimensional live view of the real-world venue based on one or more captured video streams, the 3D live view generated for a first physical point-of-view of the live event, wherein the first physical POV is anchored to a first physical location in the real-world venue. The computer-readable medium includes program instructions for generating audio of the live event based on one or more captured audio streams of the live event, the audio being broadcasted over a plurality of sound sources arranged throughout the real-world venue. The computer-readable medium includes program instructions for modifying the audio to reflect acoustics of the real-world venue for the first physical location. The computer-readable medium includes program instructions for synchronizing the audio that is modified to the 3D live view. The computer-readable medium includes program instructions for streaming the live view and audio that is synchronized and modified via a network to an HMD of a first remote user for display, the first remote user being located outside of the real-world venue, the live view and audio that are streamed presenting a first augmented reality view of the live event to the first remote user through the HMD.

In still another embodiment, a computer system is described, and includes a processor, and memory coupled to the processor and having stored therein instructions that, if executed by the computer system, cause the computer system to execute a method for localizing sound when enabling participation in a live event. The method includes establishing a multi-player gaming session controlled by a plurality of players through execution of a gaming application at a server, the multi-player gaming session generating an interactive gaming world within which player participation is enabled, the live event being a real-world venue where the plurality of players is present. The method includes generating at the server a three dimensional live view of the real-world venue based on one or more captured video streams, the 3D live view generated for a first physical point-of-view of the live event, wherein the first physical POV is anchored to a first physical location in the real-world venue. The method includes generating audio of the live event based on one or more captured audio streams of the live event, the audio being broadcasted over a plurality of sound sources arranged throughout the real-world venue. The method includes modifying the audio to reflect acoustics of the real-world venue for the first physical location. The method includes synchronizing the audio that is modified to the 3D live view. The method includes streaming the live view and audio that is synchronized and modified via a network to a head mounted display of a first remote user for display, the first remote user being located outside of the real-world venue, the live view and audio that are streamed presenting a first augmented reality view of the live event to the first remote user through the HMD.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
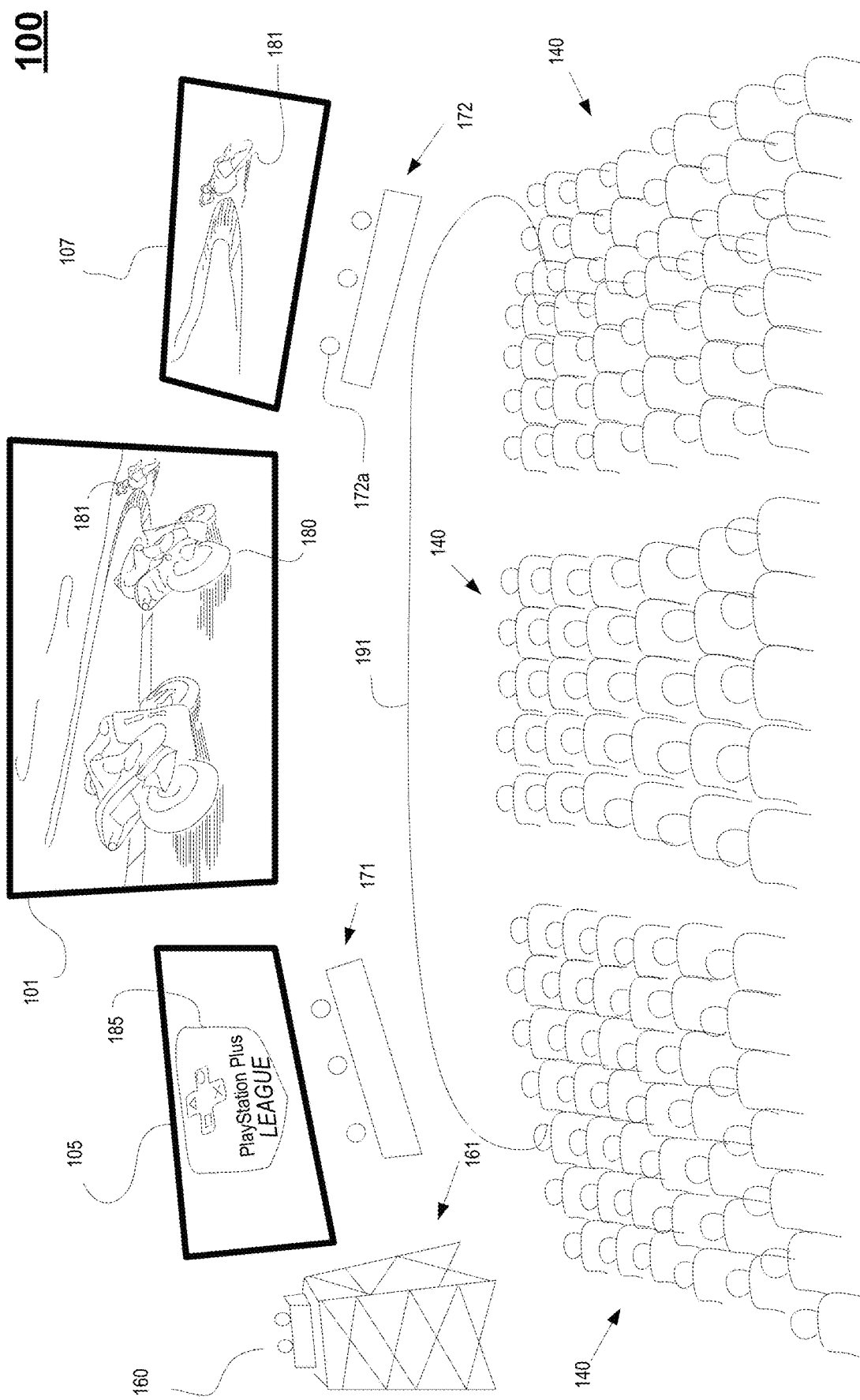
FIG. 1A illustrates an electronic sports (eSports) arena showcasing a live video gaming competition, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe methods and systems for participating in a live event (e.g., live eSports event including competitive video gaming) by a remote user as a virtual audience member, in accordance with embodiments of the present disclosure. Various technologies are described giving the remote user a fully immersive experience within the real-world venue (e.g., eSports arena), including presenting a live view of the eSports event that is virtually generated for a POV taken from a selected seat in the real-world venue. In a preview mode, a remote user is able to preview the POV from one or more selected seats in the eSports arena, wherein the preview includes a live view of the eSports event, or a generic view of a previous event held in the eSports arena. An augmented reality view of the eSports event may be presented, wherein the augmented view is virtually generated for a POV taken from a selected seat in the real-world venue, and includes the live view of the eSports event that is augmented with digital data (e.g., inserting a digitized representation of a friend of the user as another virtual audience member).

In addition, a remote user participating in a live event (e.g., eSports event) as a virtual audience member may receive a live view that is augmented in part to reflect the position in the real-world venue from which the live view is generated, wherein the live view that is augmented includes audio that is localized to reflect the sound characteristics of the selected position within the real-world venue. In particular, the position of the real-world venue may correspond to a seat in the venue. As such, the live view that is augmented is generated as if the user was sitting in that seat. The real-world seat has unique sound characteristics to reflect the layout of the venue (e.g., walls, distance from speakers, barriers, echoing patterns, etc.). The audio for the live event (e.g., generated, captured, etc.) is modified to be consistent with the sound characteristics, and is further aligned with the video of the live event. In that manner, the remote user viewing the live view that is augmented will receive the same experience as if he or she was physically at the real-world venue. Further, different remote users will get different sound deliveries of the audio from the live event that is based on their selected locations (that determine the generation of the live view that is augmented) and their corresponding sound characteristics (reflect acoustics for that location in the real-world venue). In summary, the sound delivery for a given location will be adjusted to be in synchronization with the live view that is augmented (e.g., virtual reality), the real-world acoustics of the venue for that chosen location, and space (e.g., distance from the origin of the sound). In this manner, the remote user will have an immersive experience including sound localization.

With the above general understanding of the various embodiments, example details of the embodiments will now be described with reference to the various drawings. For purposes of clarity and brevity, embodiments of the present invention are described in relation to the various technologies supporting an immersive experience of a remote user virtually participating in a live eSports video gaming event; however, it is understood that VR content may be generated for any type of event, including real events and/or virtual events.

FIG. 1A illustrates an electronic sports (eSports) arena 100, as an example of a real-world venue, showcasing a live eSports event, such as a video gaming competition, in accordance with one embodiment of the present disclosure. The live eSports event may be based on a video game that is being simultaneously played by a plurality of professional gamers in competition with each other. As previously described, the live eSports event may be produced to include the professional gamers each playing a video game within a gaming world, one or more broadcasters or announcers that follow and promote the action within the gaming world to the audience members (e.g., live participants, remote participants, and/or virtual participants), and live audience members.

For example, the eSports arena 100 includes arena seating 140, wherein live audience members may be seated within arena seating 140, and participate in the live event as members of a live audience. As shown in FIG. 1A, the arena seating 140 is filled with live audience members. As will be further described, remote users may also participate in the live event as a virtual audience member that is seated within arena seating 140.

The arena seating 140 faces the front 191 of a stage 190. The stage includes a first podium including a first team 171 of professional gamers. The stage also includes a second podium including a second team 172 of professional gamers. As shown, each team includes three team members. The team members are each simultaneously playing a multi-player video game (e.g., MOB). For purposes of illustration only, the video game is a motorcycle racing game, wherein each professional gamer is a motorcycle racer racing through a course within the video game. Team members may assist each other in achieving an overall winning result. For example, the team with the best overall finishing results wins the event.

One or more arena sized displays and/or monitors are present on or about the stage 190. The content shown on the displays are produced by a behind the scenes video production team that directs the presentation of the live eSports event both within the eSports arena, and to the streaming audience. For example, a main display 101 shows a view of the gaming world that may be of particular interest at that moment in time. For illustration, main display 101 may show the leaders of the motorcycle race from a viewpoint of a character of one of the professional gamers. In particular, three racers are just ahead of the racer whose viewpoint is shown in main display 101. In another implementation, main display 101 is showing a view into the gaming world that may not align with any of the characters of the professional gamers, but instead provides an optimum view into the action between the professional gamers within the gaming world.

As shown, side display 107 is located directly above the second team 172, and may present a view that is associated with the game play of one of the gamers on the second team 172. For example, motorcycle racer 180 may be a character being controlled by professional gamer 172a of the second team 172, and the viewpoint of motorcycle racer 180 is being shown in side display 107. In particular, the viewpoint of motorcycle racer 180 includes a view of other riders ahead of racer 180 on the course, including the back of motorcycle racer 181, wherein racer 181 is ahead of motorcycle racer 180 on the racecourse. Racer 181 may be controlled by one of the available professional gamers on either the first team 171 or the second team 172.

Side display 105 is located directly above the first team 171, and may present a view that is associated with the game play of one of the gamers on the first team 171. In addition, the images presented on either side display 105 and 107 may provide additional content rather than being limited to game play of one of the professional gamers. For example, side display 105 includes an image of a symbol 185 that represents an eSports league supported by SONY PlayStation (e.g., PlayStation Plus League). For illustration, the video game generating the motorcycle racing game play of the professional gamers on the first team 171 and the second team 172 is promoted by the eSports league.

The stage also includes a tower 161 that elevates one or more broadcasters 160 that provide live announcing and entertainment throughout the event. The broadcasters 160 fulfill a vital role in promoting the live event within the eSports arena as well as to the streaming audience, and virtual audience. For example, as an exciting moment occurs within the game play of one of the professional gamers, the announcers may highlight that game play through their announcing as it is being presented on the main display 101. The audience members typically react favorably to the announcing by the broadcasters 160.

Figure 1B:
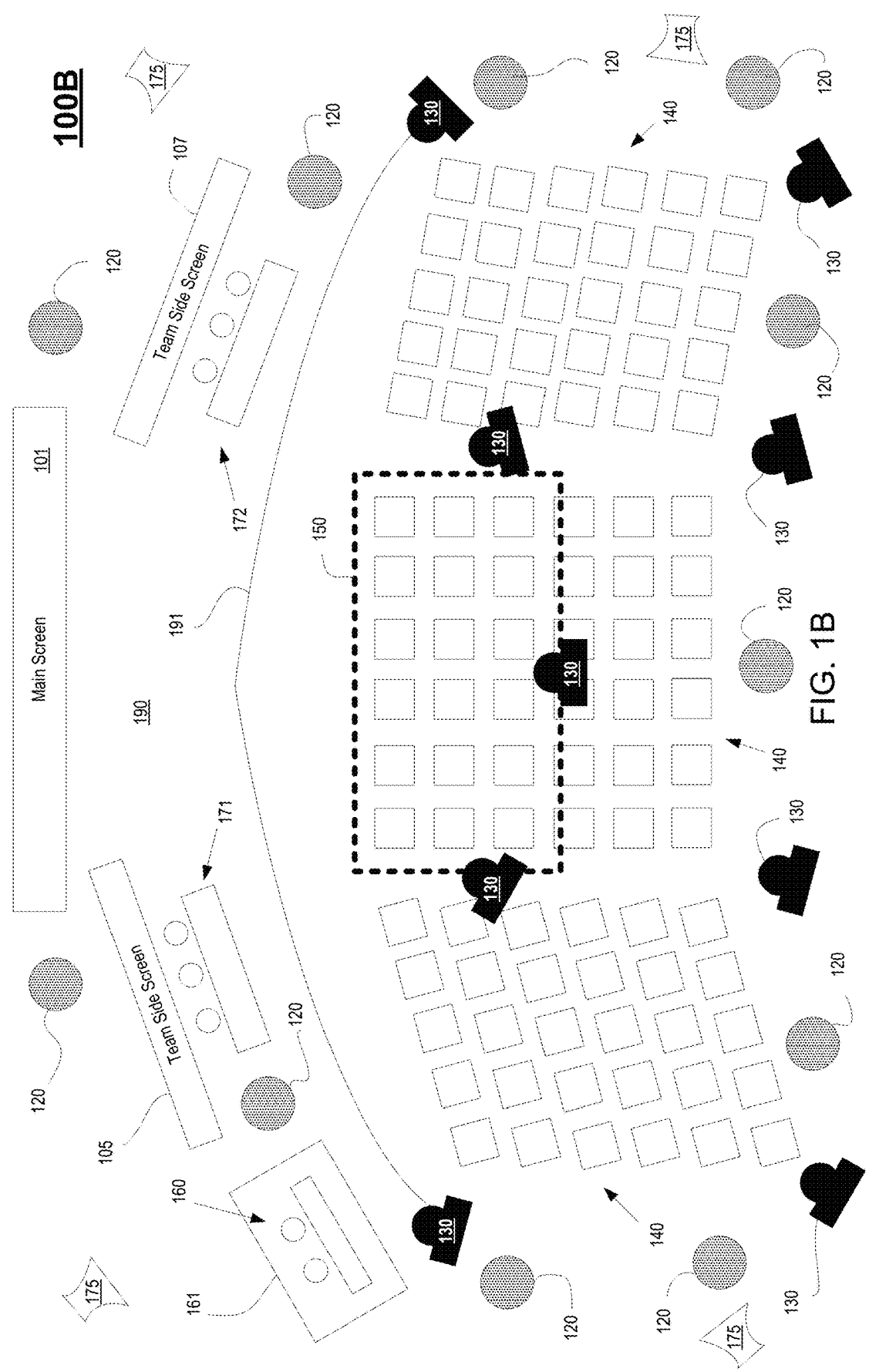
FIG. 1B illustrates a floor plan view of the eSports arena including the locations of video and audio data collection devices, in accordance with one embodiment of the present disclosure.

FIG. 1B illustrates a floor plan 100B view of the eSports arena 100 introduced in FIG. 1A, and includes the locations of video and audio data collection devices, in accordance with one embodiment of the present disclosure. The front 191 of stage 190 is presented in front of the arena seating 140. The stage 190 includes a first podium seating the first team 171 and a second podium seating the second team 172. Located about the stage 190, a side display 105 is located above team 171, and side display 107 is located above team 172, as previously described. The main display 101 is shown at a location in the center of stage 190. In addition, stage 190 supports tower 161 that holds the broadcasters 160.

A plurality of data collection devices is shown. For example, one or more audio collection devices 120 (e.g., recorders) are located throughout the eSports arena 100, as illustrated in map 100B. In that manner, audio from the professional gamers may be recorded, as well as audio from the audience in general, or from individual audience members. That is, the audio collection devices 120 are positioned to best pick up sounds from a desired target. The audio collected may be routed back to the speakers 175 for increased audience projection. Speakers 175 also provide audio in conjunction with the images presented on the displays 101, 105, and 107. Further, the audio collected may be used within a live view of the eSports event. In addition, the audio collected may be used to support a virtual view of the live eSports event, or an augmented view of the live eSports event.

In addition, one or more video collection devices 130 (e.g., video cameras) are located throughout eSports arena 100, as illustrated in map 100B. In that manner, video from the live eSports event may be recorded. This may include wide angled views and close-up views of the audience members, individual audience members, the teams 171 and 172, individual gamers on the teams 171 and 172, the stage 190, the screens 101, 105 and 107 on stage 190, etc. In particular, the images recorded from the video collection devices may be used to generate virtual views of the live eSports event, as presented from a location from anywhere in the eSports arena (e.g., from a selected seat in arena seating 140). The virtual views of the live eSports event may be stitched together from video recordings taken from one or more video collection device 130. Because the virtual experience of the live eSports event generated for the VIP section 150 is intended to be more immersive, additional video collection devices 130 may be assigned to record images from locations in or about VIP section 150. In that manner, more detailed POVs may be generated for each of the seats in the VIP section 150 based on videos from a large number of video collection devices, instead of the one or two views assigned to the seats in VIP section 150 that are stitched from a minimum amount of video collection devices 130.

Figure 2A:
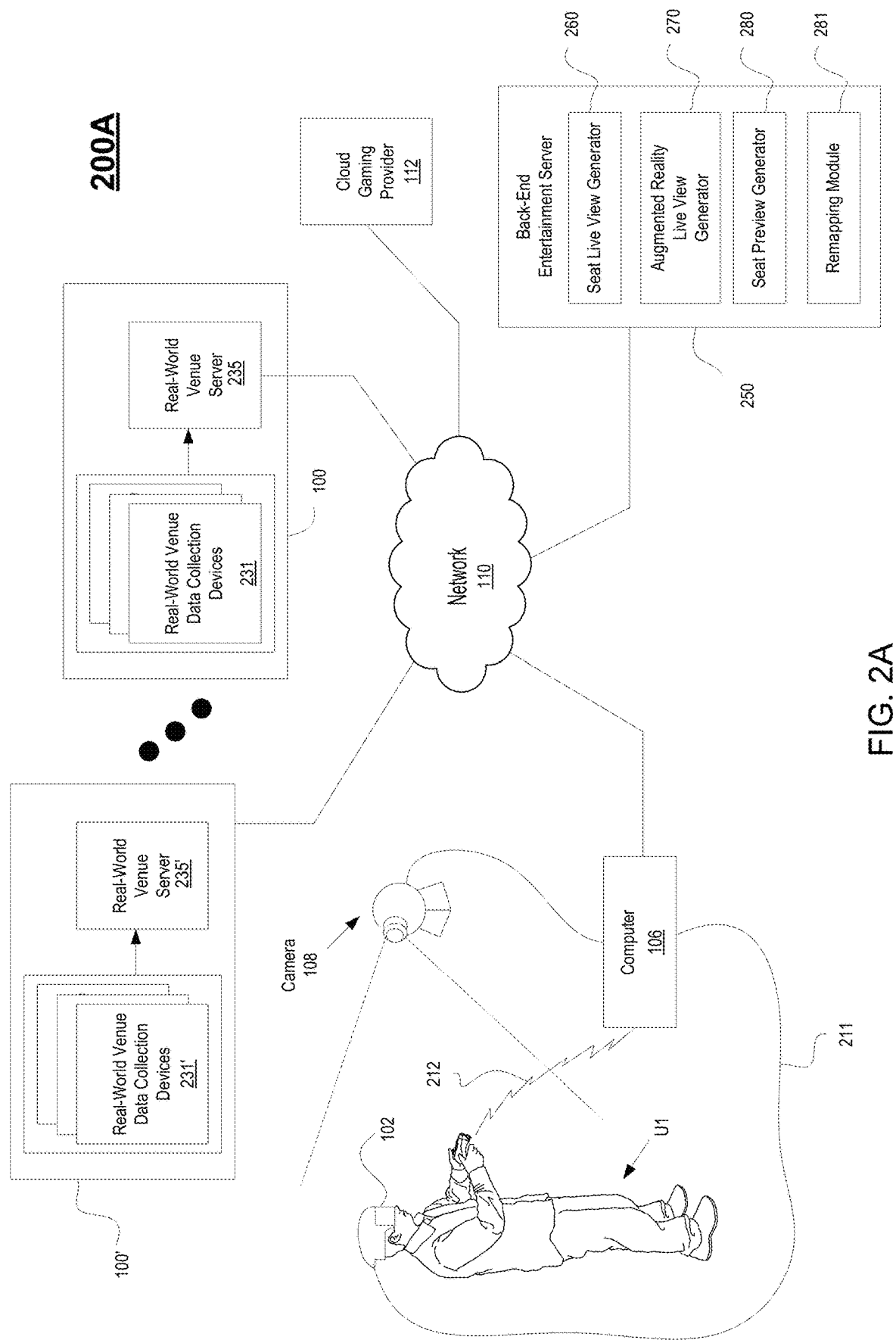
FIG. 2A illustrates a system configured for providing an interactive experience with VR content, such as an eSports live event (e.g., video gaming competition), in accordance with one embodiment of the present disclosure.

FIG. 2A illustrates a system for remote participation in a live eSports event, such as a video gaming competition, in accordance with an embodiment of the invention. A user U1 is shown wearing a head-mounted display (HMD) 102. The HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, HMD 102 is configurable to present a live view of the eSports event. The live view may be generated from real-world venue data collection devices 231 located at the real-world venue 100 (e.g., eSports arena), as managed by a real-world venue server 235. The server 235 may be local to the venue or remote from the venue. In a truly or near live view, the live view is generated with minimal or no modification to the collected data. That is, the near live view is similar to viewing a live traditional sporting event (e.g., basketball, baseball, boxing, football, tennis, etc.) over a network, except that the near live view is projecting views as collected within the real-world venue. The collected data may be collected in a format ready for display using an HMD, or may be formatted for display within the HMD. In other embodiments, the view presented by the HMD is a hybrid and/or augmented reality view of the live event that is modified to present a live view from a specific location in the arena 100, and may be augmented with digital data or transformation. That is, the hybrid view is generated from live views collected from data (e.g., video) collection devices 231 (e.g., video collection, camera, audio recorder, speaker, temperature monitor, pressure monitor, etc.) throughout the arena 100. The hybrid view may be stitched from the live views, and present a more traditional video or image to the user U1. That is, the hybrid view may not be considered as virtual. In some embodiments, the hybrid view may be an augmented reality view that is generated in part from the live views collected from the data collection devices 231. That is, the augmented reality view inserts digital content into the live view collected by the data collection devices and minimally modified, as previously described. In still other embodiments, the hybrid view presented by the HMD is a virtual view of the live event that is generated from the live views collected from the data collection devices 231. That is, the virtual view is a digital representation of the live eSports event.

In one embodiment, the information gathered from the data collection devices 231 and the real-world venue server 235 are delivered to a back-end entertainment server 250, such as over network 110. In one embodiment, entertainment server is configured for generating the live and hybrid views, previously introduced, for various locations (e.g., POVs corresponding to seating locations in arena 100). In particular, entertainment server includes a seat live view generator 260 that is configured for generating live views of the live event occurring at the eSports arena. The live view generator 260 may generate live views for any location within the arena, such as using stitching technologies that stitch data (e.g., audio and/or video) collected from multiple sources. In addition, entertainment server includes an augmented reality live view generator 270 that is configured to overlay digital content over the live views of the live eSports event. For instance, a remote user participating in the live eSports event as a virtual audience member may view a digital avatar representation of another remote user (e.g., a social network friend to user U1) sitting in the adjacent seat, as viewed through an augmented live view of the eSports live event. Also, entertainment server includes a seat preview generator 280 that is configured for presenting a preview of the live and/or hybrid view that may be experienced by user U1 in association with POVs for one or more selected seats in arena 100. Specifically, as the user U1 navigates through a preview interface to select a seat in the arena seating 140, an option may be provided to show a preview of the live and/or hybrid view generated for that seat. The user U1 may select a given seat through the same interface. Further, the entertainment server includes a remapping module 281 configured to change the mapping schedule of components and devices used for generating the live and/or augmented reality views of the real-world venue when a remote participant changes viewing locations (e.g., changing a seat in the virtual or augmented representation of the real-world venue). That is, when the viewing location is changed, different sets of capture devices may be used to generated the live, hybrid, and/or augmented views. For example, different sets of video capture devices, audio capture devices, speakers, etc. may be used when generating views for a first location and a second location within the real-world venue. As such, the remapping module 281 is configured to determine the appropriate capture devices used for generating views for a particular location, and assigning those devices during a remapping for purposes of generating the appropriate live, hybrid, and/or augmented reality views for the new location. In some embodiments, the functions and features provided in the entertainment server 260 and real-world venue server 235 may be performed at one location, such as real-world venue server(s) or the entertainment server(s).

In one embodiment, the HMD 102 can be connected to a computer 106. The connection to computer 106 can be wired over connection 211 or wireless over connection 212. The computer 106 can be any general or special purpose computer known in the art, including but not limited to, a gaming console, personal computer, laptop, tablet computer, mobile device, cellular phone, tablet, thin client, set-top box, media streaming device, etc. In the traditional sense, the computer 106 can be configured to execute a video game, and output the video and audio from the video game for rendering by the HMD 102. Execution of the video game may be further supported by a cloud gaming network 200 that is configured for maintaining and executing a video game being played by one or more users, such as in a MOG, or massively multi-player online game (MMOG). For instance, the cloud gaming network 200 may support the video game being played within the live eSports event. In some embodiments, the functions and features provided in the entertainment server 260 and cloud gaming network 200 may be performed at one location, such as the cloud gaming network 200 or the entertainment server(s) 260. In addition, the computer 106 may be configured to receive live and/or hybrid views of the eSports live event as delivered to remote user U1. That is, the computer 106 is not restricted to executing a video game but may also be configured to execute an interactive application, which outputs VR content (e.g., live and/or hybrid views of the sports live event) for rendering by the HMD 102.

The user 100 may operate a controller 104 to provide input for controlling the interactive experience when participating in the live and/or hybrid view of the live eSports event. For example, the controller may be used to select a seat within the arena seating 140, or to select a preview of a live and/or hybrid view corresponding to a selected seat. In addition, controller 104 may be used to provide input into an executing video game. Additionally, a camera 108 can be configured to capture image of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with the entertainment server 250. That is, the server 250 generates the live and/or hybrid views shown by the HMD 102, and the computer 106 transmits inputs from the HMD 102, controller 104, and camera 108 to the server 250. The output from the entertainment server, such as video, data, audio data, digital data, is transmitted to computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In a more traditional sense, the computer 106 may function as a thin client in communication over the network 110 with the cloud gaming provider 112. The cloud gaming provider 112 maintains and executes a video game being played by the user U1. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the entertainment server 250 and/or cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless. The cloud gaming provider 112 processes the inputs to affect the game state of the executing video game. The output from the executing video game, such as video data, audio data, and haptic feedback data, is transmitted to the computer 106 for onward transmission to the respective devices. In other embodiments, computer 106 may be configured to execute a video game that has been downloaded. Computer 106 may work cooperatively with cloud gaming provider 112 to execute the video game. For example, execution of the video game may start on the cloud gaming provider 112, and once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108.

In one embodiment, multiple live events may be available to one or more remote users. For instance, a live event may be occurring at the real-world venue 100'. The real world venue 100' is similarly configured as venue 100, and includes a real-world venue server 235' and one or more data collection devices 231'. As such, the remote user U1 may be able to participate in multiple live events, by hopping from one event to another event. That is, the remote user U1 is able to experience a live, hybrid, and/or augmented reality view of the live event occurring at real-world venue 100 from a selected seat in the venue, and then hop to another live event occurring at real-world venue 100' to have another, different experience of that live event. As an example, on any given Sunday multiple live events may be occurring (e.g., football, soccer, etc.), and a remote user may hop from one live event to another live event to experience different live, hybrid, and/or augmented reality views of selected events.

In still another embodiment, a remote user U1 may experience a recorded event. That is, the remote user may wish to view an previously recorded event in the same manner as described above. In that manner, the remote user may still access live (previously recorded, and live to the viewer), hybrid, and/or augmented reality views of the previously recorded event. Because the data has been captured and stored, these views can be regenerated after the event has occurred and streamed to the remote user. As before, the remote user may select a particular location (e.g., seat) in the real-world venue, and move to a different location, to gain views of the now recorded event. In another embodiment, a group of remote users may wish to experience the recorded event through a recording session. That is, the group of remote users may be located at different physical locations. The recording session generates a new play of the recorded event with a common timeline for all users in the group. As such, each of the group of users may have their own live (previously recorded, and live to the viewer), hybrid, and/or augmented reality views of the previously recorded event that is aligned in time with the other users in the group. For example, the group of users may experience a music concert together in the virtual or augmented reality space. In that manner, the group of users may select seating in one area of the virtual representation of the real-world venue, and be able to see representations of the other users in the group within their view of the recorded event. Further, users in the group would be able to interact with each other in the real-world, such as holding a real-world conversation while viewing the recorded event.

Figure 2B:
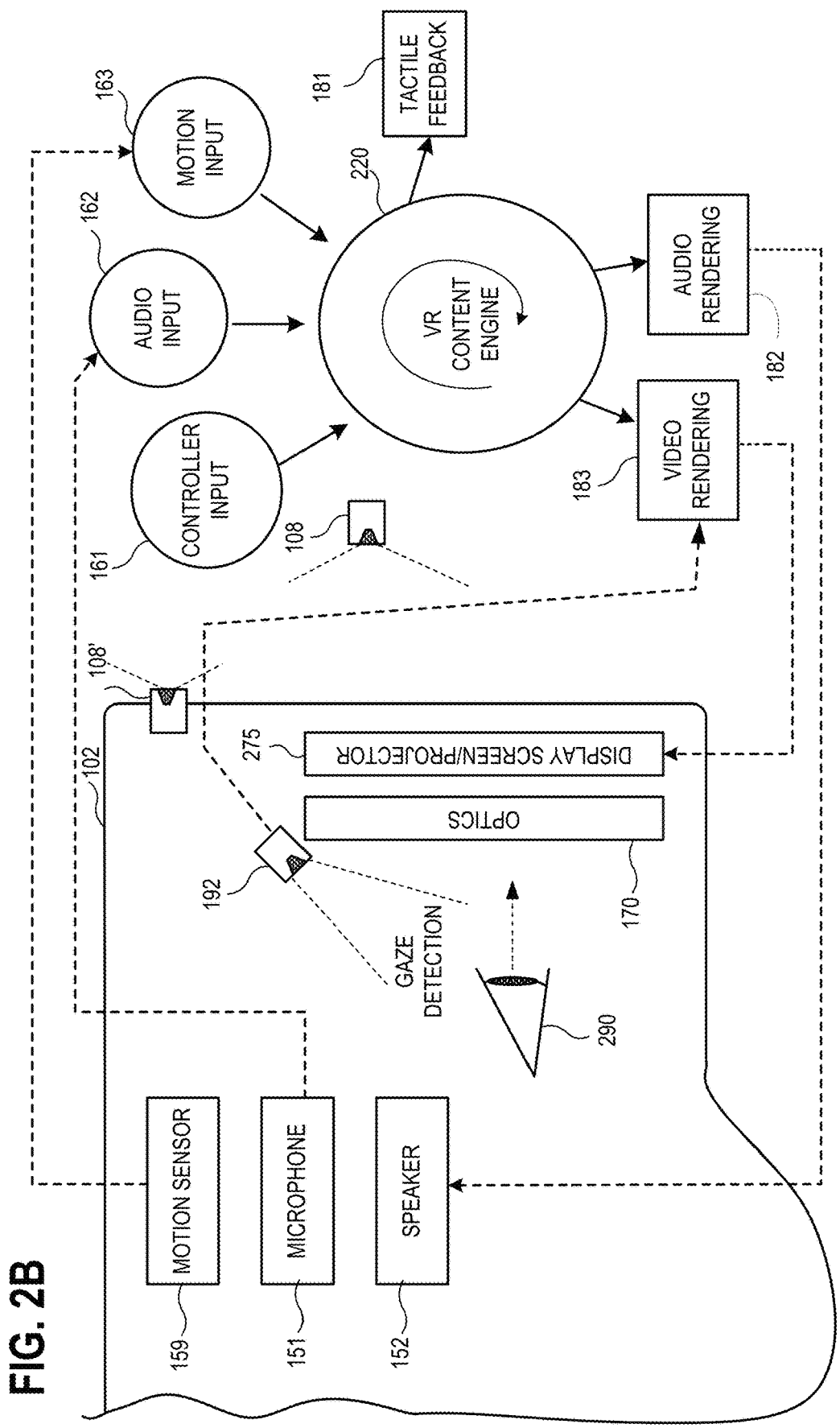
FIG. 2B conceptually illustrates the function of a HMD in conjunction with the display of VR content, such as an eSports live event (e.g., video gaming competition), in accordance with an embodiment of the invention.

FIG. 2B conceptually illustrates the function of a HMD 102 in conjunction with the generation of VR content (e.g., execution of an application generating live and/or hybrid views of a live eSports event, and/or video game, etc.), in accordance with an embodiment of the invention. In some implementations, the VR content engine 220 is being executed and/or generated on a back-end entertainment server 250 that is communicatively coupled to the HMD 102 via a computer 106 (not shown). In some embodiments, the computer 106 executes and/or generates part of the VR content. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 220 executing an application may be a live and/or hybrid view selection and/or generation engine, wherein the live and/or hybrid view is related to an eSports live event. In a more traditional sense, the VR content engine may be a video gaming engine executing a video game, and is configured to receive inputs to update a game state of the video game. The following description of FIG. 1B is described within the context of the VR content engine 220 executing a video game, for purposes of brevity and clarity, and is intended to represent the execution of any application capable of generating VR content. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the VR content engine 220 receives, by way of example, controller input 161, audio input 162 and motion input 163. The controller input 161 may be defined from the operation of a gaming controller separate from the HMD 102, such as a hand-held gaming controller 104 (e.g. Sony DUALSHOCK® 4 wireless controller, Sony PlayStation® Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. The VR content engine 220 (e.g., executing a gaming application) receives inputs which are processed according to the configuration of the game engine to update the game state of the video game. The engine 220 outputs game state data to various rendering modules which process the game state data to define content which will be presented to the user.

In the illustrated embodiment, a video rendering module 183 is defined to render a video stream for presentation on the HMD 102. A lens of optics 170 in the HMD 102 is configured for viewing the VR content. A display screen 275 is disposed behind the lens of optics 170, such that the lens of optics 170 is between the display screen 275 and an eye of the user, when the HMD 102 is worn by the user. In that manner, the video stream may be presented by the display screen/projector mechanism 275, and viewed through optics 170 by the eye 290 of the user. An HMD user may elect to interact with the interactive VR content (e.g., VR video source, video game content, etc.) by wearing the HMD and selecting a live and/or hybrid view of the eSports live event, or a video game for game play, for example. Interactive virtual reality (VR) scenes are rendered on the display screen 175 of the HMD. In that manner, the HMD allows the user to be completely immersed in the live and/or hybrid view of the eSports live event, or game play of a gaming application, by provisioning display mechanism of the HMD in close proximity to the user's eyes. The display regions defined in the display screen of the HMD for rendering content may occupy large portions or even the entirety of the field of view of the user. In one embodiment, the lens of optics 170 and display screen are disposed within a support structure of the HMD 102 that is configured to fit around the head of the user, such as user 102, when the support structure is worn. Further, the lens of optics 170 and display screen 175 are disposed within the support structure, such that the display screen 175 is located in front of one or both eyes of the user when the HMD 102 is worn. Typically, each eye is supported by an associated lens of optics 170 which is viewing one or more display screens.

An audio rendering module 182 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 192 is included in the HMD 102 to enable tracking of the gaze of the user. Although only one gaze tracking camera 192 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 192, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 181 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

In one embodiment, the video rendering 183 and audio rendering 182 may be configured to present a live and/or hybrid view of a live eSports event as displayed within HMD 103. For example, the live and/or hybrid view may be generated from a POV of a specific seat in the arena seating 140 of an eSports arena 100 of FIG. 1A. As previously described, the live view may be recorded from one or more captured views of the eSports arena, and presented with minimal modification as a POV of a selected seat. In another embodiment, a hybrid view may be generated by stitching one or more captured views of the eSports arena. Another hybrid view may be generated by incorporating digital content into the stitched live view, such as in the form of providing augmented reality views. For example, a digitized form of a friend to a user U1 is presented in the augmented reality view of U1). In still other embodiments, a completely virtual view of the live eSports event is presented in HMD 102.

Figure 3A:
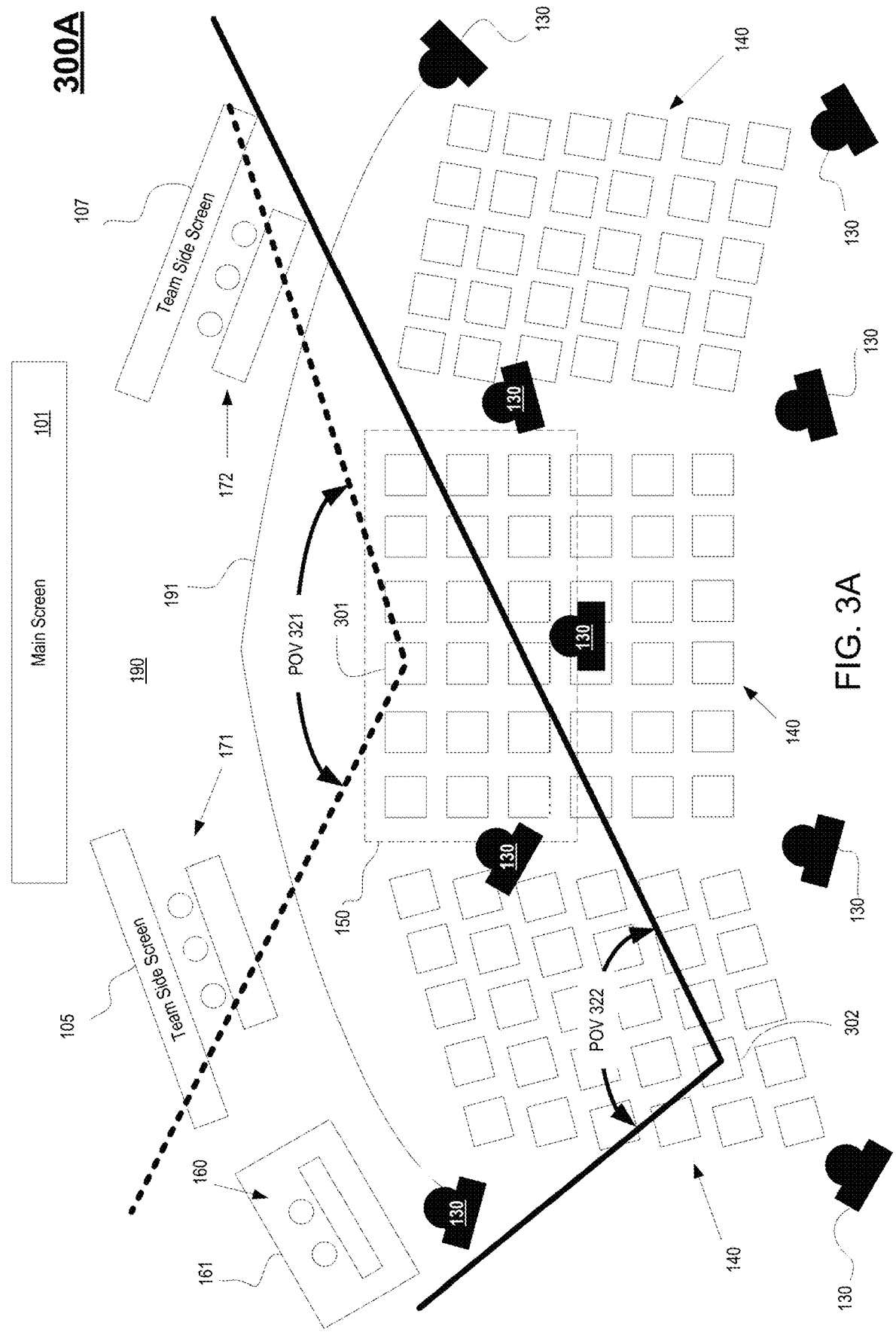
FIG. 3A illustrates a floor plan view of the eSports arena introduced in FIG. 1B, and includes two point-of-views (POVs) generated from two seats in the eSports arena, in accordance with one embodiment of the present disclosure.

FIG. 3A illustrates a floor plan view 300A of the eSports arena 100 introduced in FIG. 1B, and includes two point-of-views (POVs) generated from two seats in the eSports arena, in accordance with one embodiment of the present disclosure. As shown and briefly discussed, floor plan view 300A includes front 191 of stage 190, arena seating 140 including a VIP section 150, main display 101, side display 105, side display 107, podium for the first team 171, podium for the second team 172, and tower 161 for seating broadcasters 160. A plurality of video data collection devices 130 is also shown positioned throughout arena 100 to collect video of the live eSports event. In addition, audio collection devices (not shown) may be located throughout arena 100 to collect audio recordings related to the eSports event.

A POV 321 is associated with seat 301 of the arena seating 140. POV 321 may be generated from one or more live video recordings. For instance, POV 321 may be generated from the video recordings of 3-6 video collection devices that can be used for reproducing the live view from seat 301. That is, the live and/or hybrid views (e.g., real, augmented reality, virtual) views of the live eSports event may be stitched together from video recordings taken from one or more video collection device 130. Because seat 301 is located within the VIP section 150, there may be more video recordings available to give a high quality rendering of the live view for each seat within the section. That is, in VIP section 150, each seat may have a uniquely generated viewing into the live eSports event. Outside of VIP section 150, a group of co-located seats (e.g., 10-20 seats) may share a uniquely generated viewing into the live eSports event. As shown, POV 321 includes a close-up view of the stage 190, and includes close views to both teams and all three displays. Because seat 301 is near the front of stage 190, the POV 321 is more desirable for providing unobstructed, large, and clear views to stage 190.

A POV 322 is associated with seat 302, wherein POV 322 may be also be generated from one or more live video recordings. For instance, POV 322 may be generated from the video recordings of 1-2 video collection devices that can be used for reproducing the live view from seat 302. That is, the live and/or hybrid views (e.g., real, augmented reality, virtual) views of the live eSports event may be stitched together from video recordings taken from one or more video collection device 130. Because seat 302 is located near the back of the arena 100, there may be limited video recordings available to give a rendering of the live view for each seat within the section. Though the rendered live view is of a high quality, the resolution of views between seats the back of the arena may be limited. That is, for seats located in the back of arena 100, and outside of VIP section 150, a group of co-located seats (e.g., 10-20 seats) near seat 302 may share a uniquely generated viewing into the live eSports event. As shown, POV 322 includes a far-away view of the stage 190, and includes far-away views to both teams, the three displays, and the broadcasting booth. Because seat 302 is near the rear of arena 100, the POV 322 is less desirable because the views may be slightly obstructed, and far-away from stage 190.

Though FIG. 3A is described in relation to providing video images for the live and/or hybrid views into the eSports live event, other embodiments are well suited to providing live and/or hybrid audio for the live eSports event that are based on a selected seat in eSports arena 100. In addition, the live and/or hybrid audio may be combined with the live and/or hybrid video for the eSports live event, and presented to a remote user who is participating in the live eSports event as a virtual audience member, for example.

Figure 3B:
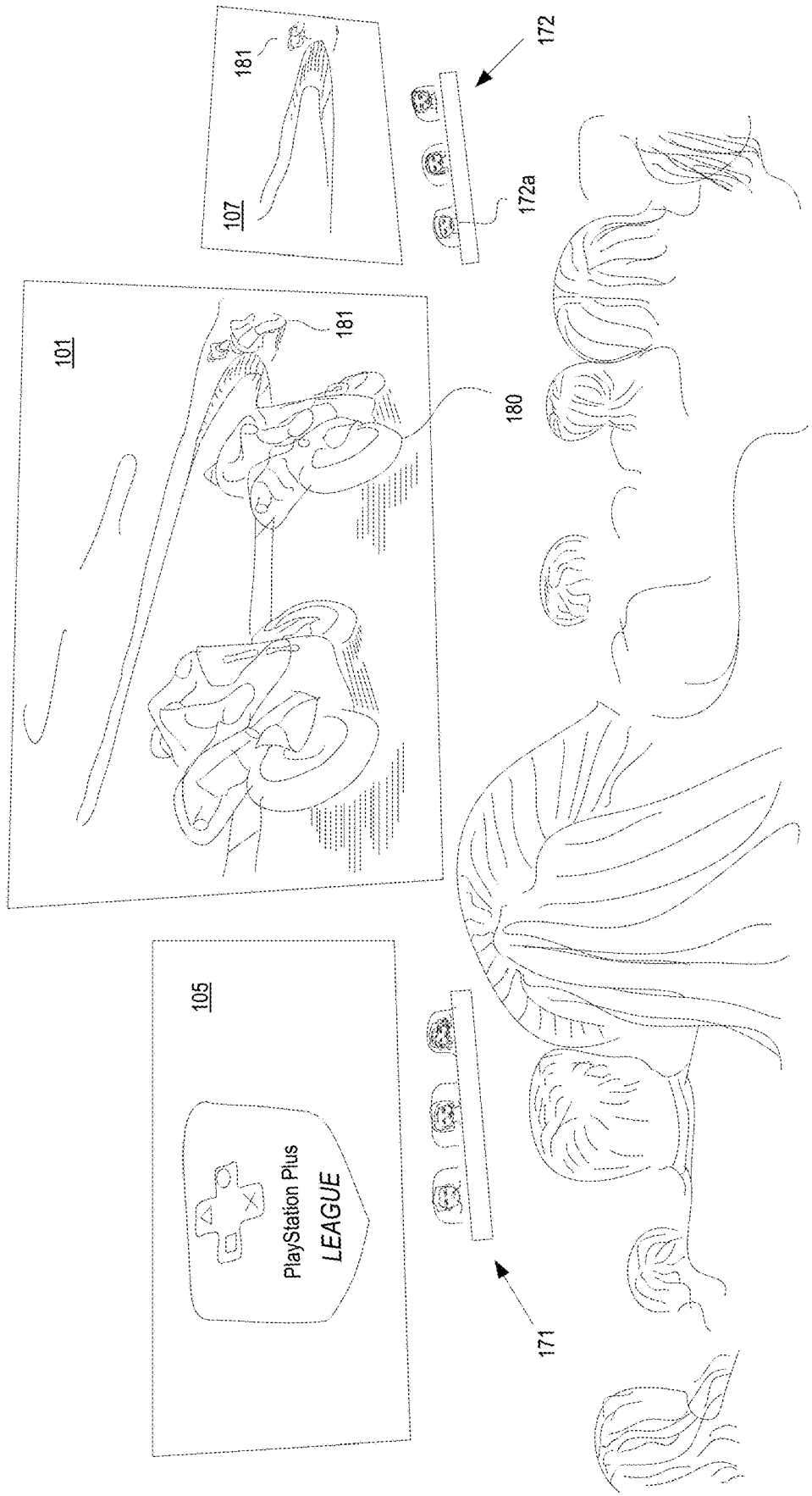
FIG. 3B illustrates a POV generated from a back seat in the eSports arena, in accordance with one embodiment of the present disclosure.

FIG. 3B illustrates an image of a video sequence shown in an HMD of a remote user (e.g., U1) that is participating in an eSports live event as a virtual audience member, wherein the image is generated from a POV 322 associated with a back seat (selected by the remote user) in the eSports arena, in accordance with one embodiment of the present disclosure. For example, the selected seat is seat 302 in the arena seating 140 of eSports arena 100 as shown at least in the floor plan view 300A of FIG. 3A.

As previously discussed, the video portion of POV 322 that is shown in an HMD of the remote user is generated from one or more live video recordings captured by one or more video collection devices. For instance, the live video recordings may be stitched together to generate a video sequence of images having a point-of-view associated with seat 302. For instance, because seat 302 is near the back of the eSports arena 100, POV 322 has a far-away view of the stage 190. As such, the members of the first team 171 of professional gamers and of the members of the second team 172 of professional gamers appear small and distant. In addition, other audience members (e.g., live participants or digitally inserted) within POV 322 shown in the HMD may obstruct at least part of the view of the stage 190. As shown in FIG. 3B, the heads of multiple audience members is shown in POV 322. Further, in POV 322 the remote user has an unobstructed view of the displays located on or about stage 190. For example, POV 322 includes a view of the main display 101 showing racers on a motorcycle course (e.g., at least racers 180 and racers 181). POV 322 includes a view of the side display 105 (e.g., showing the PlayStation Plus LEAGUE logo) that is located above the first team 171.

Also, POV 322 includes a view of the side display 107 showing the game play view of the team member 172a controlling motorcycle racer 180. As previously described, side display shows the viewpoint of motorcycle racer 180 including a view of the back of motorcycle racer 181, wherein racer 181 is ahead of motorcycle racer 180 on the racecourse.

Figure 3C:
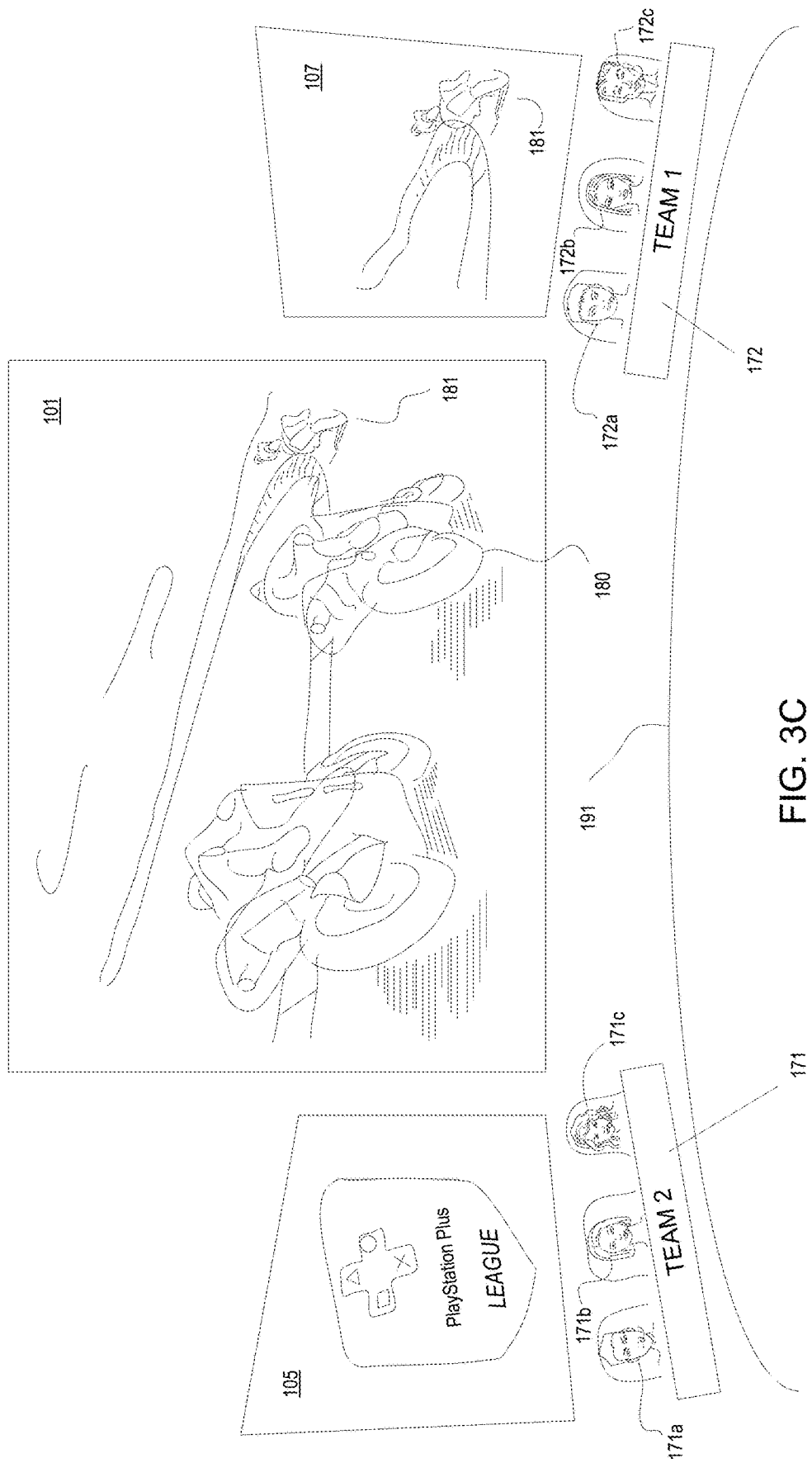
FIG. 3C illustrates a POV generated from a front row VIP seat in the eSports arena, in accordance with one embodiment of the present disclosure.

FIG. 3C illustrates an image of a video sequence shown in an HMD of a remote user (e.g., U1) that is participating in an eSports live event as a virtual audience member, wherein the image is generated from a POV 321 associated with a front row seat (selected by the remote user) in the eSports arena, in accordance with one embodiment of the present disclosure. For example, the selected seat is seat 301 in the VIP section 150 of arena seating 140 of eSports arena 100 as shown at least in the floor plan view 300A of FIG. 3A.

As previously discussed, the video portion of POV 321 that is shown in an HMD of the remote user is generated from one or more live video recordings captured by one or more video collection devices. For instance, the live video recordings may be stitched together to generate a video sequence of images having a point-of-view associated with seat 301. Because seat 301 is located in VIP section 150, a higher number of live video recordings may be captured to generate POV 321 in comparison to the number of recordings captured for generating POVs for seats outside the VIP section. In particular, because seat 301 is at or near the front of eSports arena 100, POV 321 has a close-up view of stage 190. That is, the view of the user from seat 301 is not obstructed by other audience members (e.g., live or digitally augmented), and the stage and objects on the stage appear large and clear to the viewer. For example, the members of the first team 171 of professional gamers is clearly shown in POV 321, wherein faces of the members are clearly identifiable, including a male gamer 171a with cropped hair, a female gamer 171b with short hair, and a female gamer 171c with long hair. Also, members of the second team 172 of professional gamers is clearly shown in POV 321, wherein faces of the members are clearly identifiable, including a male gamer 172a with short hair, a female gamer 172b with short hair, and a male gamer 172c with short hair. Further, in POV 321, the remote user has a clear and large view of the displays located on or about stage 190. For example, POV 321 includes a large view of the main display 101 showing at least racers 180 and racers 181. POV 322 includes a clear and large view of side display 105 (e.g., showing the PlayStation Plus LEAGUE logo) that is located above the first team 171. POV 322 also includes a clear and large view of side display 107 showing the game play view of the team member 172a controlling motorcycle racer 180 (including a view of the back of motorcycle racer 181).

When comparing FIGS. 3B and 3C, the POV 321 of front row seat 301 has a clearer view of stage 190 than the POV 322 of rear seat 302. This is similar to the experience of audience members that are attending a concert in a concert arena, or those attending a movie in a theater, or those attending a Broadway show in a theater, or those attending any event in any type of arena. As such, the experience of a remote user selecting seat 301 may be more vivid than a user selecting seat 302.

Figure 4A:
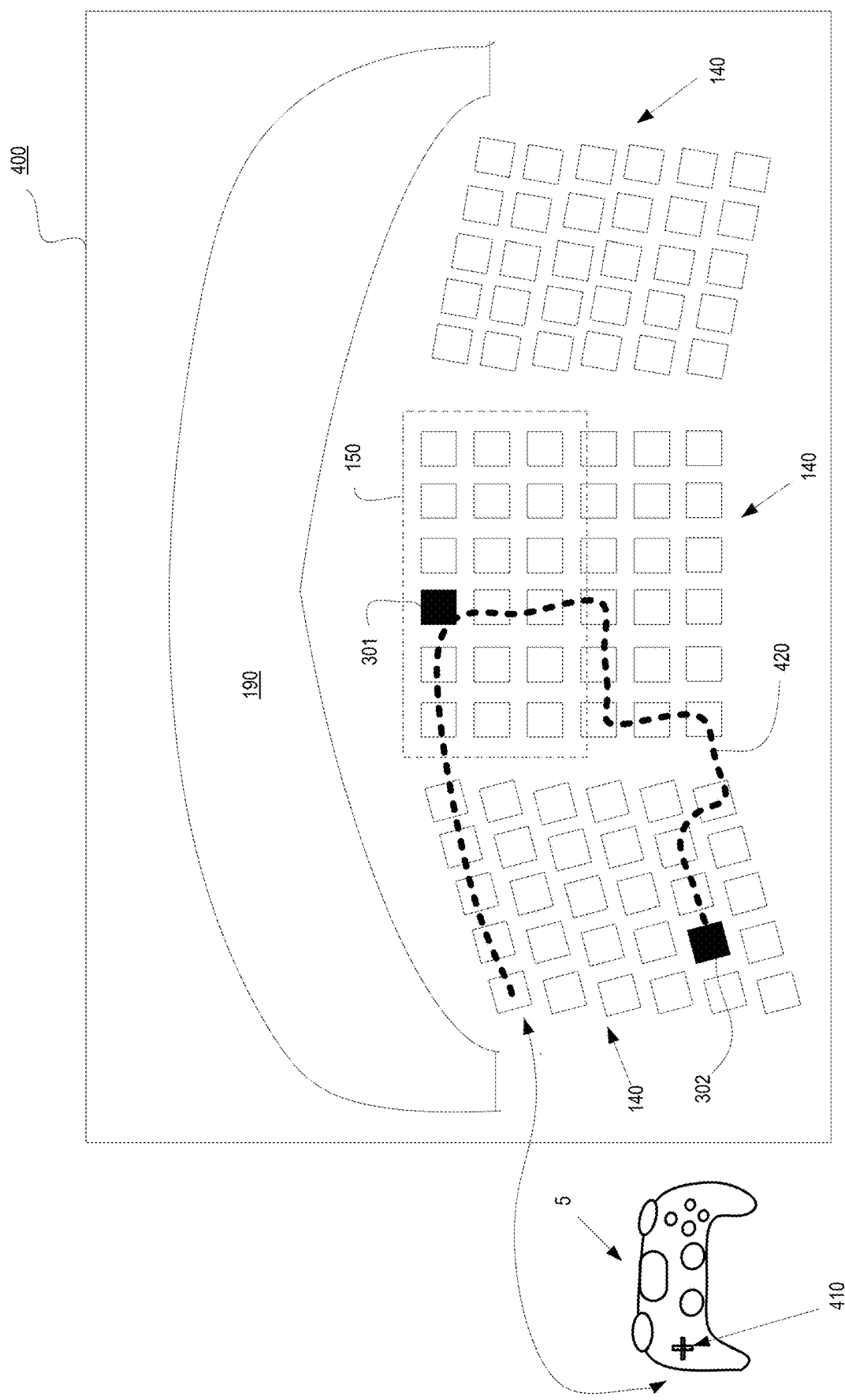
FIG. 4A illustrates the selection process for selecting one or more seats in the eSports arena, one seat at a time, for purposes of generating previews of the eSports live event taken from the viewpoint of a selected seat, in accordance with one embodiment of the present disclosure.

FIG. 4A illustrates the selection process for selecting one or more seats in the eSports arena, one seat at a time, for purposes of generating previews of the eSports live event taken from the viewpoint of a selected seat, in accordance with one embodiment of the present disclosure. For example, the remote user U1 of FIG. 2A communicates with the back-end entertainment server 250 for purposes of participating in a live eSports event as a virtual audience member. In particular, user U1 interfaces with seat preview generator 280 in order to preview the POVs from one or more seats in arena seating 140 of the eSports arena 100 previously introduced. The preview and seat selection process shown in FIG. 4A is exemplary, and is intended to show the ability to preview POVs of seats in arena seating 140.

As shown in FIG. 4A, user U1 may use controller 5 to interact with interface 400 that may be generated by seat preview generator 280. For instance, interface 400 shows a floor plan view of the stage 190 and seating 140 of the eSports arena 100. Using the directional buttons 410 on controller 5, user U1 may navigate through the arena seating 140 to select one or more seats for purposes of obtaining a preview of respective POVs. Other means for navigating through the floor plan view showing the arena seating are contemplated, such as using an analog stick, a touch screen, etc. For example, path 420 shows the navigation by user U1 through arena seating 140 as presented in the interface 400. Path 420 travels across the first row of seats from left to right, and first settles on seat 301 in VIP section 150 to obtain a POV preview, as will be described in FIG. 4B. Path 420 may continue onto seat 302 to obtain a POV preview, as will be described in FIG. 4C.

Figure 4B:
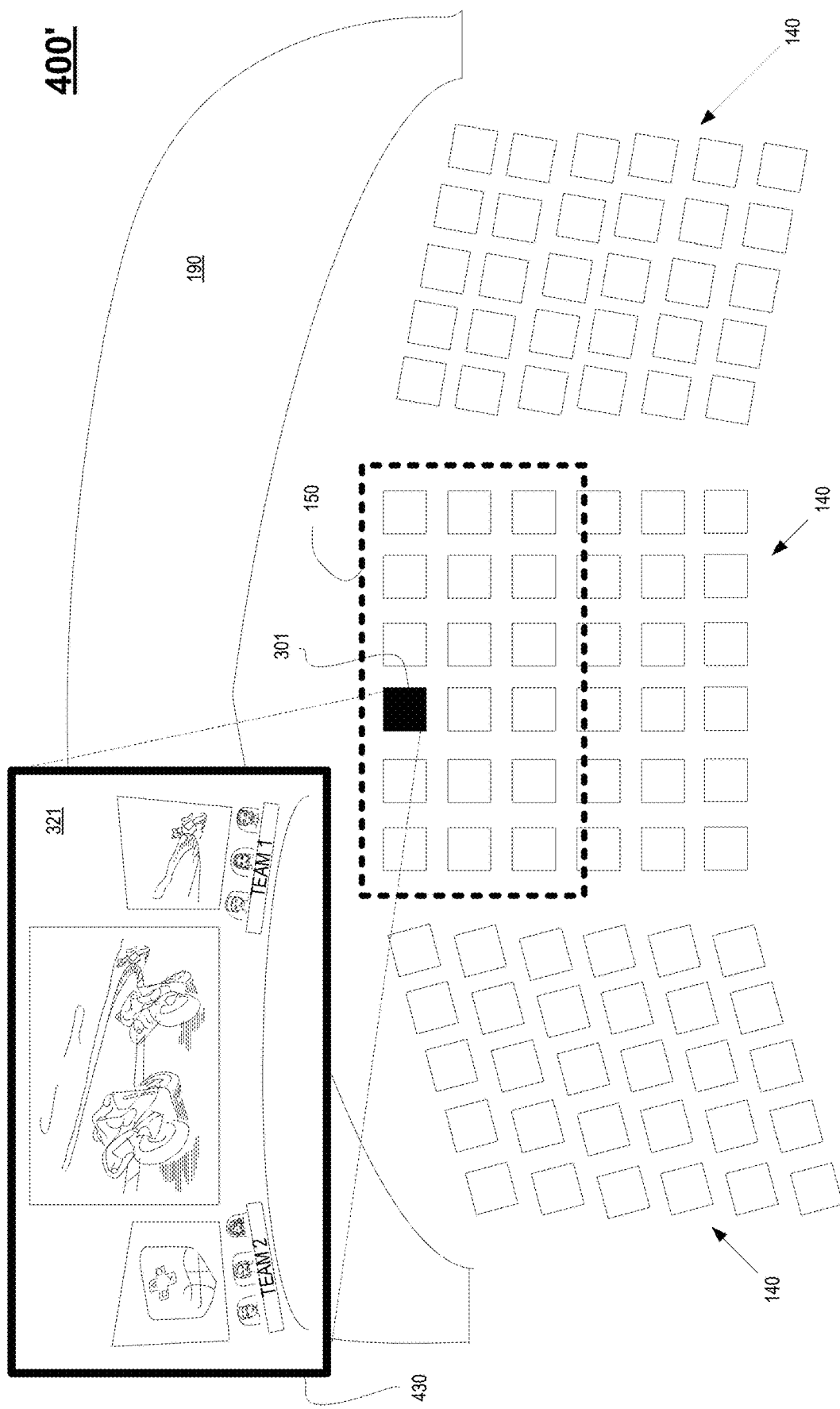
FIG. 4B illustrates a preview of the POV introduced in FIG. 3C that is generated from a front row VIP seat in the eSports arena shown in relation to a seating map of the eSports arena, in accordance with one embodiment of the present disclosure.

FIG. 4B illustrates a preview of the POV 321 introduced in FIG. 3C that is generated from a front row seat 301 in the VIP section 150 of the eSports arena 100, in accordance with one embodiment of the present disclosure. The preview of POV 321 is shown in relation to a floor plan view of the eSports arena as provided in interface 400'. In particular, user U1 has selected seat 301 in interface 400 of FIG. 4A and desires a preview of the POV from that seat. As such, interface 400' of FIG. 4B provides a preview window 430 that shows the POV 321 that is generated for seat 301, wherein the image shown in POV 321 was previously described at least in FIG. 3C. That is, a user selecting seat 301 would ultimately receive and view POV 321 in an HMD worn by the user. That is, preview window 430 shows a sampling of the POV 321 experienced by a user sitting in seat 301.

Figure 4C:
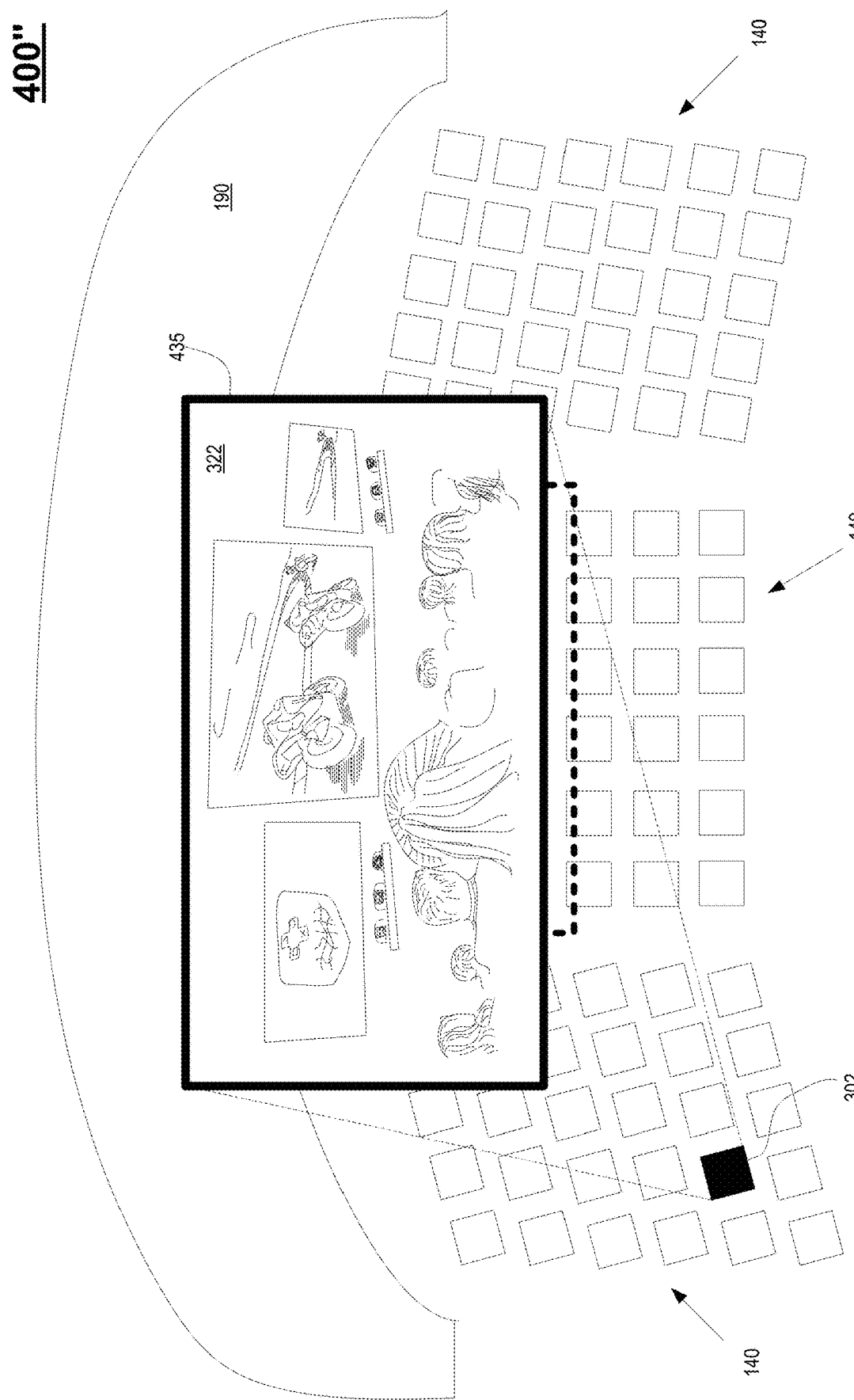
FIG. 4C illustrates a preview of a POV introduced in FIG. 3B that is generated from a back seat in the eSports arena shown in relation to a seating map of the eSports arena, in accordance with one embodiment of the present disclosure.

FIG. 4C illustrates a preview of a POV 322 introduced in FIG. 3B that is generated from a back seat 302 in the eSports arena 100, in accordance with one embodiment of the present disclosure. The preview of POV 322 is shown in relation to a floor plan view of the eSports arena as provided in interface 400". In particular, user U1 has selected seat 302 in interface 400 of FIG. 4A and desires a preview of the POV from that seat. As such, interface 400" of FIG. 4C provides a preview window 435 that shows the POV 322 that is generated for seat 302, wherein the image shown in POV 322 was previously described at least in FIG. 3B. That is, a user selecting seat 302 would ultimately receive and view POV 322 in an HMD worn by the user. That is, preview window 435 shows a sampling of the POV 322 experienced by a user sitting in seat 302.

Figure 5A:
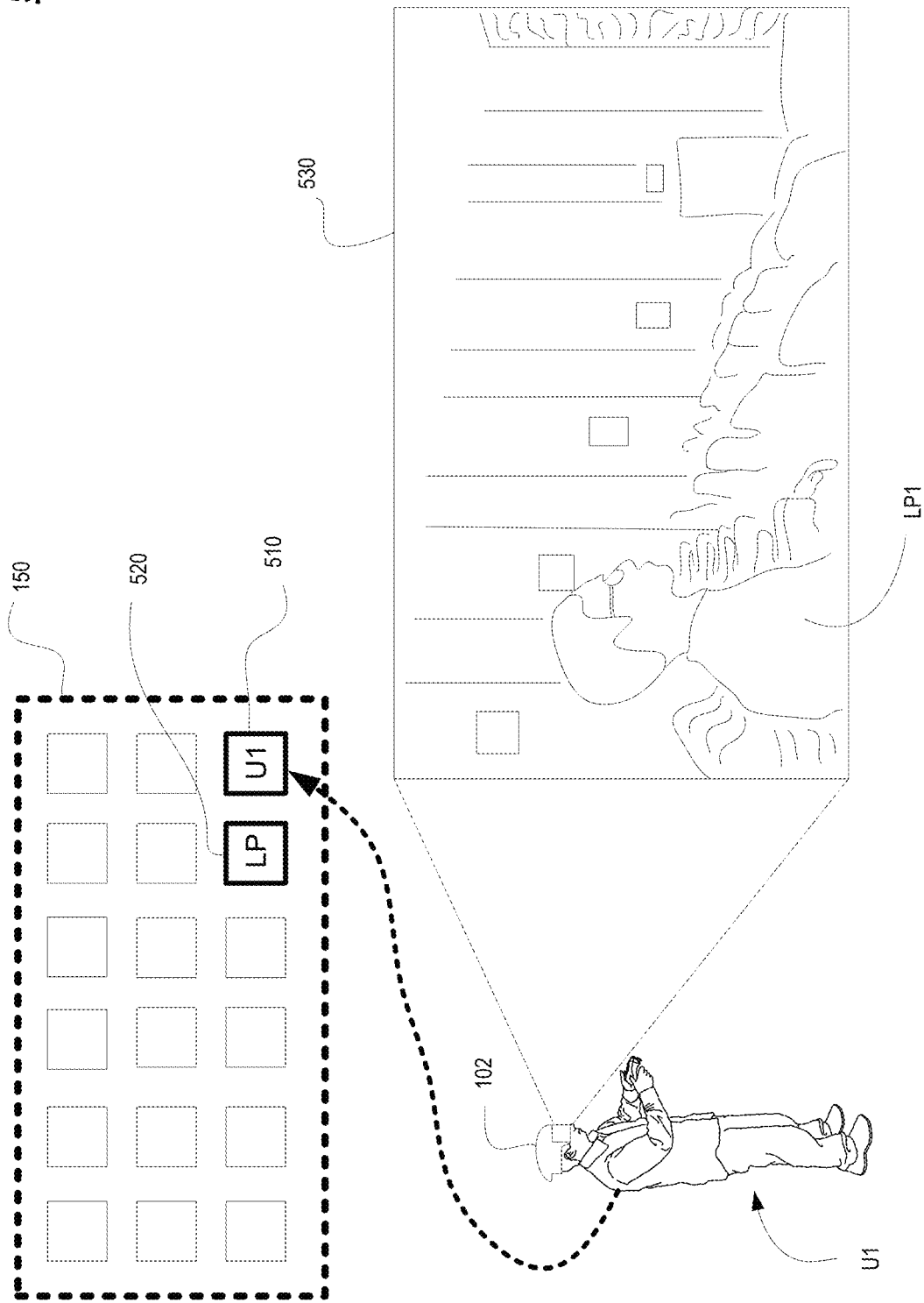
FIG. 5A illustrates a POV of a remote user U1 participating in the eSports live event (e.g., video gaming competition) and virtually seated at one of the physical seats in the eSports arena, wherein as the remote user looks to the left, the POV of the remote user U1 includes a view of a live participant (LP) audience member, in accordance with one embodiment of the present disclosure.

FIG. 5A illustrates a POV of a remote user U1 participating in the eSports live event (e.g., video gaming competition) and virtually seated at one of the physical seats in the eSports arena, wherein as the remote user looks to the left, the POV of the remote user U1 includes a view of a live participant (LP) audience member, in accordance with one embodiment of the present disclosure. In particular, the remote user U1 is able to participate in a live eSports event, such as from the comforts of a living room in the house of U1. As such, after selection of a seat in the eSports arena, user U1 is presented with a POV of the live event as taken from the selected seat as viewed through an HMD 102. In that manner, user U1 is able to participate in the live eSports event, as if he or she were actually sitting in the eSports arena in the selected seat.

As previously described, a live and/or hybrid view of the live eSports event may be generated and presented to the user U1 through an HMD. For example, the live or nearly live view may take unprocessed or minimally processed audio and video recordings of the live event, such as the recording from one or more data collection devices. That is, the nearly live or live view is generated with minimal or no modification to the collected data, such as when viewing a live traditional sporting event through multiple television recording cameras. In addition, the hybrid view of the live eSports event may be generated from the live views collected from data collection devices (e.g., audio, video, etc.) located throughout the eSports arena. In one implementation, the hybrid view may stitch together one or more live video recordings, as well as one or more audio recordings. In another embodiment, a hybrid view is presented as augmented reality that is generated in part from the live views collected from one or more data collection devices, and that includes digital content that is inserted into the live view, wherein the live view may be generated by stitching together one or more live views collected from data collection devices. In still another embodiment, the HMD may present an entirely virtualized view of the live eSports event, wherein the virtualized view is a digital representation of the live eSports event.

In particular, FIG. 5A shows that user U1 has selected seat 510 in the VIP section 150 of eSports arena 100. Directly to the left of seat 510 is seat 520. A live participant (e.g., audience member) is actually sitting in seat 520. FIG. 5A shows the immersive experience of user U1, as the POV 530 shown in HMD 102 represents a view as the user U1 looks to the left in the eSports arena 100. The user U1 is virtually transported into the eSports arena 100 and should have an experience not unlike as if user U1 was actually sitting in seat 510. As such, POV 530 that is shown in HMD 102 would include a view of the live participant (LP) that is actually seated in seat 520.

Figure 5B:
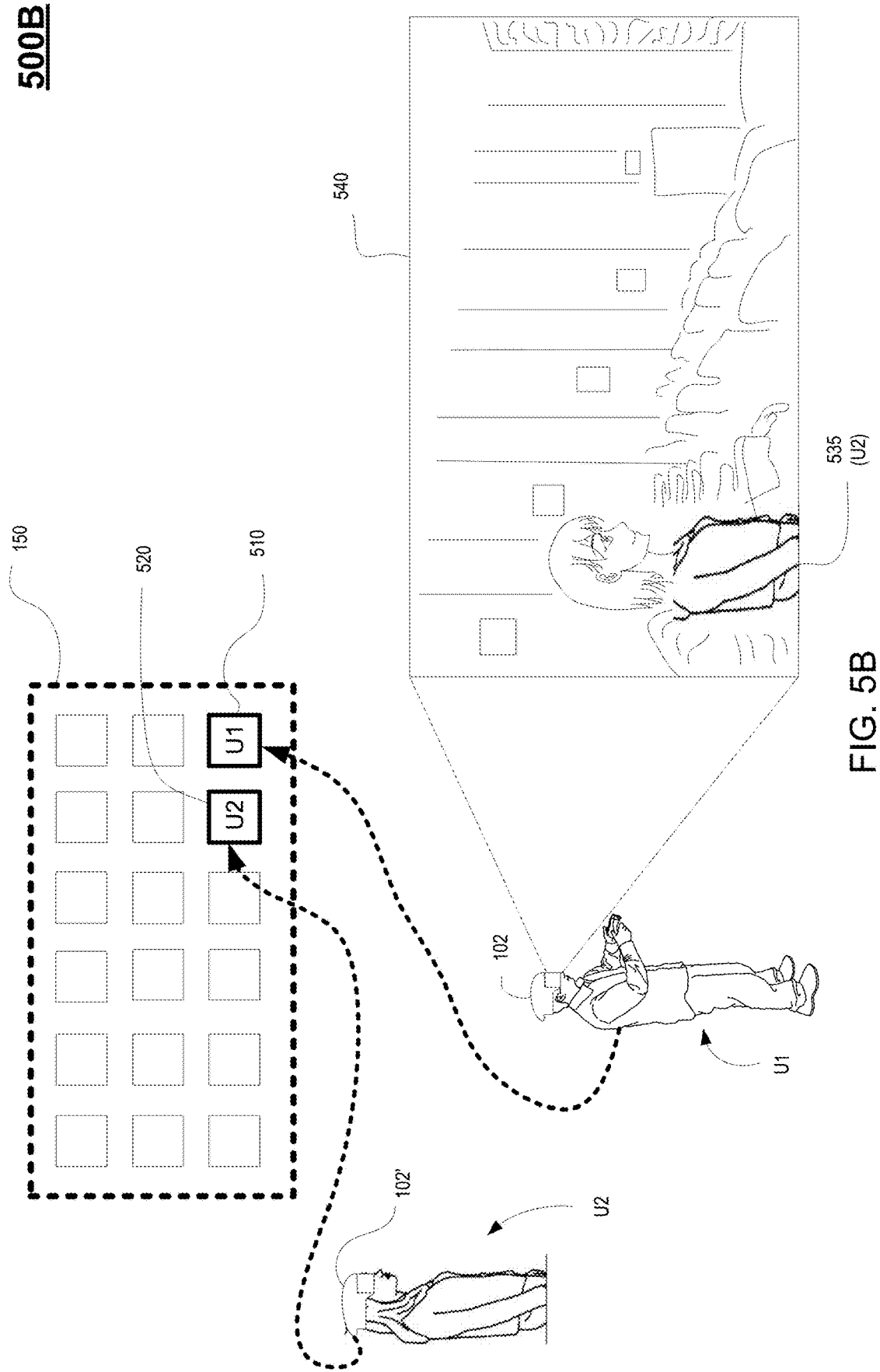
FIG. 5B illustrates a POV of a remote user U1 participating in the eSports live event (e.g., video gaming competition) and virtually seated at one of the physical seats in the eSports arena, wherein as the remote user looks to the left, the POV of the remote user U1 includes a view of a remote user spectator U2 participating in the live event as a virtual participant (i.e., remote user U2 is a virtual audience member), in accordance with one embodiment of the present disclosure.

FIG. 5B illustrates a POV of a remote user U1 participating in the eSports live event (e.g., video gaming competition) and virtually seated at one of the physical seats in the eSports arena, wherein as the remote user looks to the left, the POV of the remote user U1 includes a view of a remote user spectator U2 also participating in the live event as a virtual participant (i.e., remote user U2 is a virtual audience member), in accordance with one embodiment of the present disclosure.

In particular, the remote user U1 is able to participate in a live eSports event, such as from the comforts of a living room in the house of U1 through the HMD 102. As such, after selection of a seat 510 in the eSports arena, user U1 is presented with a POV of the live event as taken from the selected seat as viewed through an HMD 102. In that manner, user U1 is able to participate in the live eSports event, as if he or she were actually sitting in the eSports arena in the selected seat.

In addition, the remote user U2 is also able to participate in the live eSports event, such as through HMD 102'. For example, user U1 and user U2 may be friends over a social network, and have agreed to attend the live eSports event (e.g., as presented through the entertainment server 250 of FIG. 2) together. As such, the users U1 and U2 may cooperatively choose adjacent seats, such as seats 510 and 520, both in the VIP section 150 of eSports arena 100. As shown, user U1 is virtually sitting in seat 510 and user U2 is virtually sitting in seat 520. That is, user U2 is sitting to the left of user U1. As such, after selection of seat 520 by user U2, user U2 is presented with a POV of the live eSports event as taken from the selected seat as viewed through HMD 102'.

Both user U1 and user U2 are able to participate in the live eSports event, as if both were actually sitting in the eSports arena in their selected seats. FIG. 5B shows the interactive experience between the two remote users U1 and U2 when participating in the live eSports event. In particular, the POVs presented to both users U1 and U2 may be augmented reality views. That is, the augmented reality view may be generated in part from the live views collected from one or more data collection devices, and includes digital content that is inserted into the live view, wherein the live view may be generated by stitching together one or more live views collected from data collection devices. For example, the digital content may be an avatar representing either user U1 or U2.

In particular, FIG. 5B shows that user U1 has selected seat 510 in the VIP section 150 of eSports arena 100. The seat 520 to the left of seat 520 is occupied by remote user U2 (e.g., a friend of user U1). That is, seat 520 is occupied by a virtual participant—remote user U2. FIG. 5B shows the immersive experience of user U1, as the POV 540 shown in HMD 102 represents a view as the user U1 looks to the left in the eSports arena 100. As previously described, user U1 is virtually transported into the eSports arena 100 and should have an experience not unlike as if user U1 was actually sitting in seat 510—with some augmentation. For instance, the avatar 535 representing remote user U2 could be inserted into the POV 540 to show avatar 535 seated in seat 520. This augmented reality effect may be digitally inserted even though a live participant (LP) may actually be sitting in seat 520 (which in that case the LP would be filtered out of the POV 540). As such, POV 540 that is shown in HMD 102 would include a view of the avatar 535 that is virtually seated in seat 520.

Similarly, a POV generated for remote user U2 as displayed in HMD 102' would represent a view as the user U2 looks around the eSports arena 100. User U2 is also virtually transported into the eSports arena 100 and should have an experience not unlike as if user U2 was actually sitting in seat 520—with some augmentation. For instance, the avatar representing remote user U1 could be inserted into the POV to show that avatar seated in seat 510. That is, if the remote user U2 would look to the right, the POV would include a view of the avatar representing user U1 that is virtually seated in seat 510.

Figure 6:
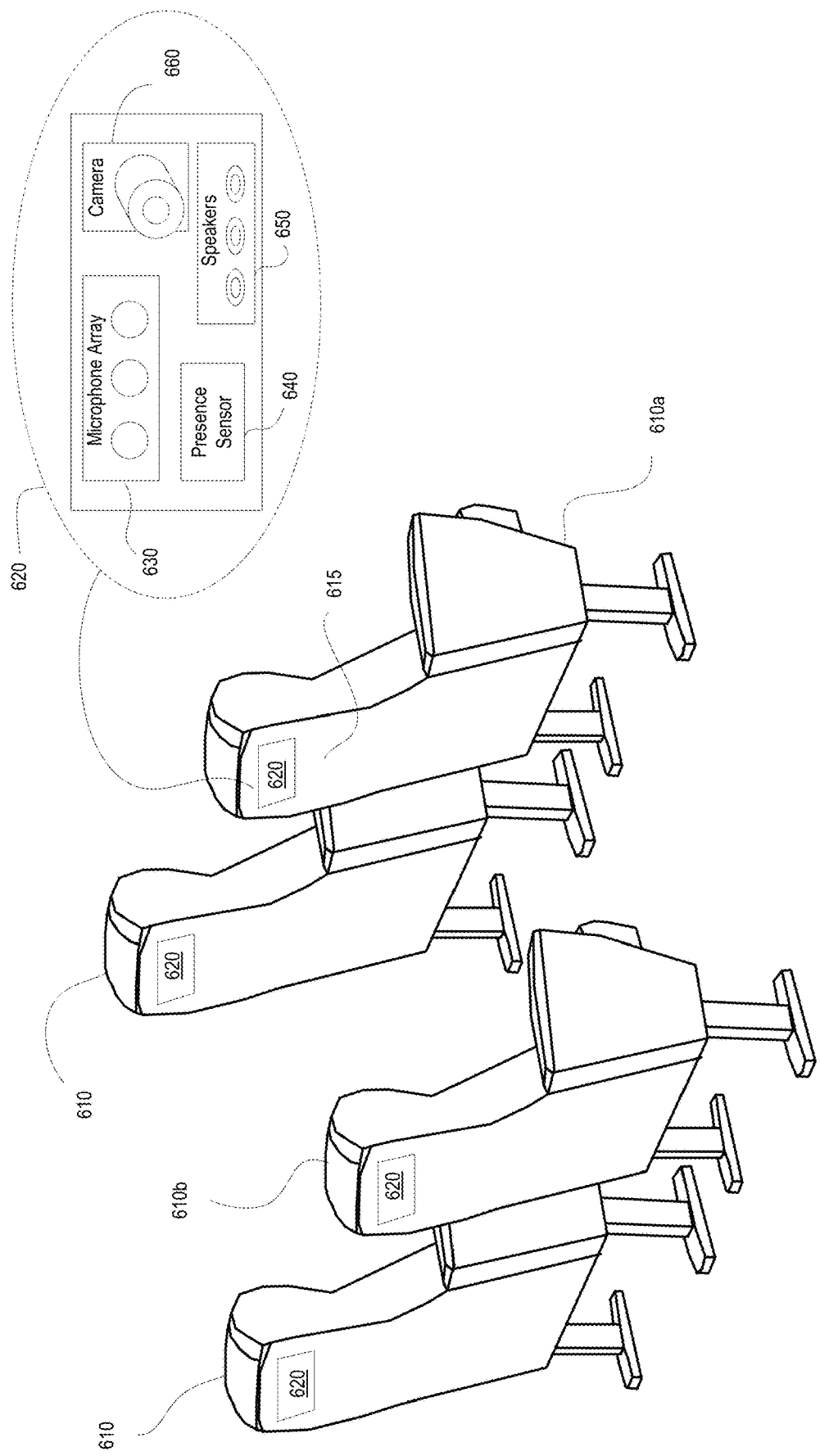
FIG. 6 illustrates a personal seat pack located on an arena seat, the personal equipment board configured to collect data related to an associated live participant that is viewing an eSports event in person, in accordance with one embodiment of the present disclosure.

FIG. 6 illustrates a personal seat pack 620 located on an arena seat 610, the personal equipment board configured to collect data related to an associated live participant that is viewing an eSports event in person, in accordance with one embodiment of the present disclosure. A plurality of arena seats 610 may be arranged in an eSports arena 100. For example, the arena seats may be arranged in rows, with one row located in front of or behind another row. In that manner, a seat in first row may be located in front of at least one seat in a second row that is behind the first row.

A seat pack 620 may be located on one or more arena seats 610. The seat pack may be located in such a way to collect data from one or more live participants. As shown, the seat pack is located on the rear of the top portion of the seat back 615 of an arena seat, and is configured to collect data from the live participant that is seated in a row behind that seat pack. For instance, seat 610a includes a seat pack 620 on the rear of the seat back 615. The seat pack 620 in seat 610a is positioned to collect from and/or provide data to a live participant located in seat 610b located in a row behind seat 610a.

Seat pack 620 includes one or more data collection devices that are configured to collect data from at least one live participant. For example, seat pack 620 located on seat 610a is configured to collect data from a live participant sitting in arena seat 610b. For example, the seat pack may include a camera 660 configured to collect images and/or video data. In that manner, the actions and face of the live participant may be collected. In one exemplary use case, the images and/or video data is used to build a live view of the eSports event to remote users. The seat pack may include a presence sensor 640 configured to determine whether a live participant is present. For instance, presence sensor 640 located in seat pack 620 on seat 610a may be configured to determine whether a live participant is sitting in seat 610b. The presence sensor 640 may implement any suitable sensing technique, such as infrared detection, sonar detection, sonic wave detection, ultrasonic wave detection, magnetic wave detection, vision detection, etc. Further, seat pack 620 may include a microphone array 630 that is configured to collect audio data, such as sounds produced by the live participant sitting in arena seat 610a. The array 630 may include multiple audio collection devices configured in a pattern suitable for beam steering and beam forming capabilities. For example, the array 630 in the seat pack located on arena seat 610a is able to determine sounds emanating from the live participant located in arena seat 610b, and filter those sounds from other sounds in the near environment. That is, the array 630 is able to pick up the sounds from the live participant located in arena seat 610b. Additional sensors may be included in seat pack 620.

Seat pack 620 may be configured to include one or more data provision devices. For example, the live participant sitting in arena seat 610b is positioned to receive data from the seat pack located on the rear of the arena seat 610a. For purposes of illustration, data provision devices may include a monitor, speakers 650, vibration devices, odor producing devices, etc. In particular, speakers 650 may be configured to provide audio to the live participant sitting in arena seat 610b, or to any participants in the immediate vicinity. For example, speakers 650 located in the seat pack on arena seat 610a may be associated with the sounds produced from a remote user who is virtually participating in the eSports event. The sounds (e.g., voice) from the remote user may be directed to a particular live participant seated in one of the seats located near seat 610a, including the live participant seated in seat 610a. As such, through speakers 650 the remote user may speak to one or more live participants in general, or may speak to a specific live participant, including the live participant sitting in seat 610a.

In one implementation, the sensors and devices in seat pack 620 could be configured in a seat pack that is removable from the arena seat 610. In still another implementation, the sensors and devices may be configured in a seat attachment that is removable from the arena seat 610. For example, the seat attachment may be a cover that surrounds at least the front of the seat 610. As an illustration, presence sensors may be located on the portion of the seat attachment adjacent to the seat cushion, such as a pressure sensor, and may detect the presence of the live participant sitting in the respective seat 610.

Figure 7A:
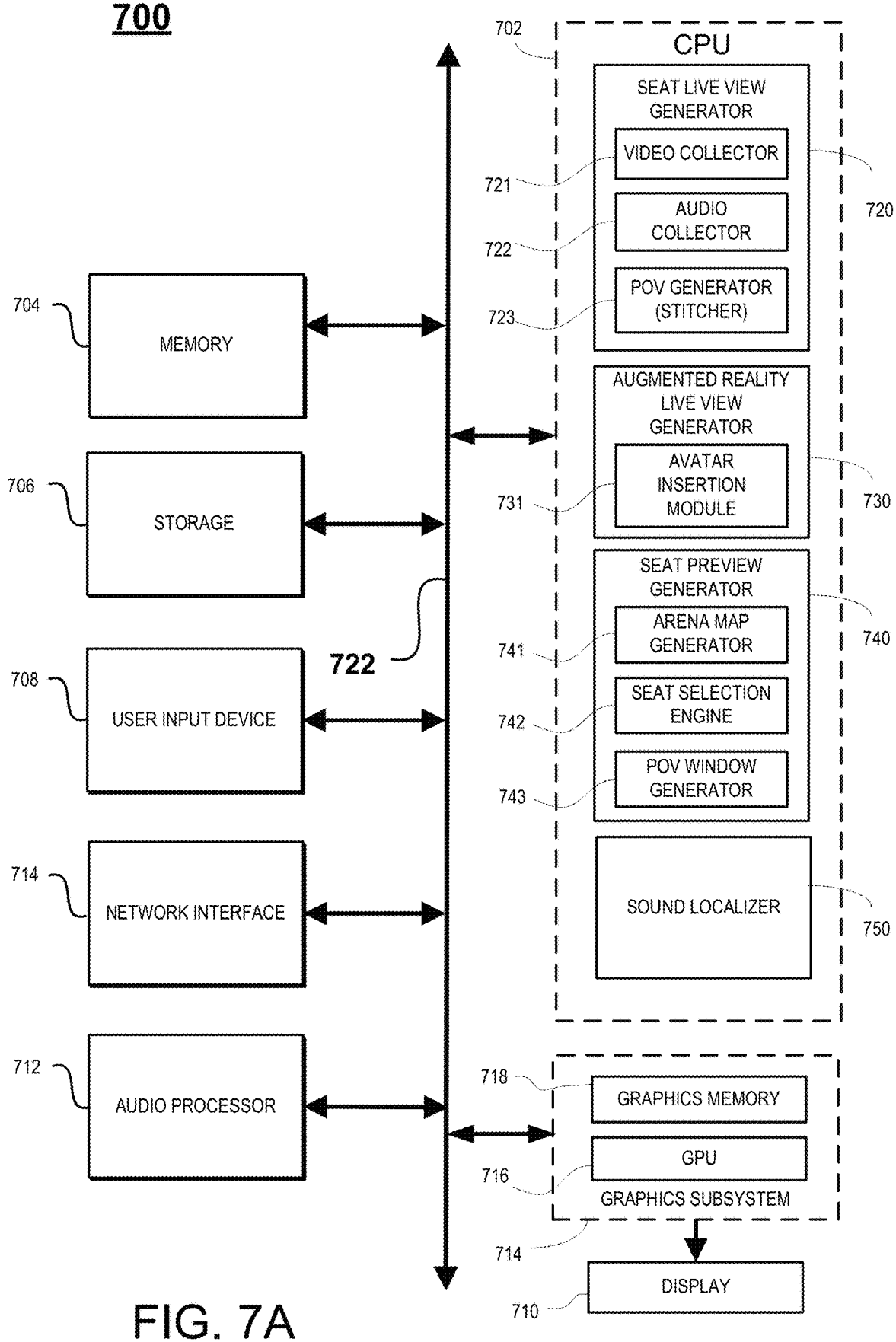
FIG. 7A illustrates components of an example device that can be used to perform aspects of the various embodiments of the present disclosure.

FIG. 7A illustrates components of an example device 700 that can be used to perform aspects of the various embodiments of the present disclosure. For example, FIG. 7A illustrates an exemplary hardware system suitable for implementing a device that provides services in support of a user participating in a live eSports event, in accordance with one embodiment of the present disclosure. This block diagram illustrates a device 700 that can incorporate or can be a server computer, personal computer, video game console, personal digital assistant, or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, device 700 could be a client side device that is supporting a back-end server, both of which are configured to support a user participating in a live eSports event. In another example, device 700 could be a server side device that is configured to support a user participating in a live eSports event via a client side device (e.g., gaming console).

In accordance with various embodiments, CPU 702 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for supporting participation in live eSports events by remote users, etc.

In particular, CPU 702 includes a seat live view generator 720 that is configured to generate views of a live event, such as an eSports event. The live views are generated for one or more locations in an arena (e.g., eSports arena) based on one or more live recordings (e.g., video, audio) collected of the live event. For example, the live recordings may be performed by a video collector 721 configured to collect images and/or video of the live event, and an audio collector 722 configured to collect audio from the environment of the arena. A POV generator 723 is configured to generate the live views for a particular location in the arena, such as a specific seat in the arena. For example, POV generator may implement a stitching technique that is configured to stitch together one or more videos of the live event taken from predefined locations in the arena to generate a live view of the event from a specific location in the arena. As such, even though a live recording may not have been collected from the specific location, a live view may be generated for that specific location based on one more live recordings of the live event. CPU 702 also includes an augmented reality live view generator 730 that is configured to present an augmented reality view for the live view generated for a specific location in the arena (e.g., by generator 720). For example, digital content may be inserted into the live view generated for that specific location. In particular, avatar insertion module 731 is configured to insert an avatar into the live view. The avatar may represent a second remote user that is participating in the live event, and is seated nearby. That is, the user corresponding to the view generated by the seat live view generator 720 and augmented reality live view generator 730 may be a first remote user that is participating in the live event, and further may be virtually seated next to or near the seat occupied by the second remote user. As such, the augmented reality view of the first remote user includes an avatar for the second remote user. Other digital content may also be inserted. CPU 702 also includes a seat preview generator 740 that is configured to generate a preview of a view of the live event that corresponds to a particular location in the arena (e.g., eSports arena 100). For example, arena map generator 741 is configured to generate a floor plan of the arena, to include a seating chart, wherein the floor plan can be used for selection of locations (e.g., seats) within the arena for which a preview is described. In particular, seat selection engine 742 is configured to generate and manage an interface that allows a user to select a location (e.g., seat) within the arena, via the floor plan. In addition, provided in the interface, the POV window generator 743 is configured to generate a preview that may include a view of the live event (e.g., eSports event) that is generated from the standpoint of the selected location (e.g., seat).

CPU 702 may also provide additional functionality related to presentation of a live event to a remote user. For example, the live event may be an eSports event that is being broadcast to remote users who wish to virtually participate in the live eSports event as a virtual audience member. In particular, a sound localizer 750 is configured to localize sound that is generated for a live view (e.g., augmented reality view based on a selected position within a real-world venue) of a live event to reflect the sound characteristics of the selected position within the real-world venue. A more detailed description of the sound localizer 750 is provided in FIG. 7B.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722

A graphics subsystem 714 is further connected with data bus 722 and the components of the device 700. The graphics subsystem 714 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 716, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710, or to be projected by projection system 740. Display device 710 can be any device capable of displaying visual information in response to a signal from the device 700, including CRT, LCD, plasma, and OLED displays. Device 700 can provide the display device 710 with an analog or digital signal, for example.

It should be understood that the embodiments described herein may be executed on any type of client device. In some embodiments, the client device is a head mounted display (HMD), or projection system.

Figure 7B:
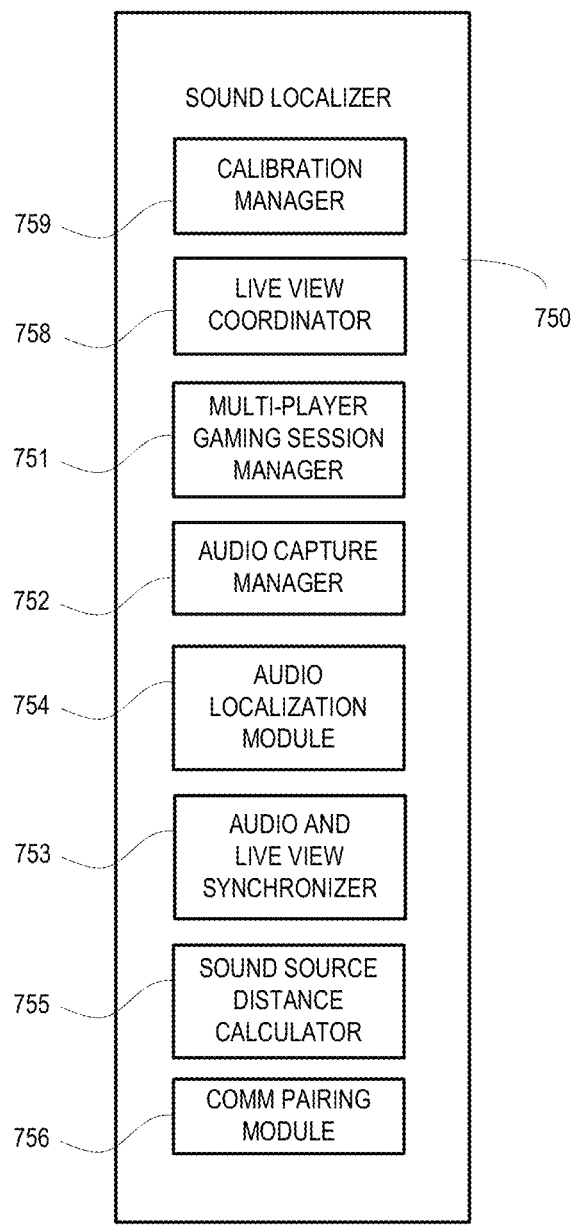
FIG. 7B illustrates components of a sound localizer 750 introduced in FIG. 7A, wherein the sound localizer 750 is configured to provide a remote user an augmented reality view of a live event, wherein audio generated for the live event is localized to a particular viewing location in the real-world venue, in accordance with one embodiment of the present disclosure.

FIG. 7B illustrates components of a sound localizer 750 introduced in FIG. 7A, wherein localizer 750 is configured to localize sound that is generated for a live view that is augmented of a live event to reflect the sound characteristics of the selected position within the real-world venue. In particular, the sound localizer includes a calibration manager 759 that is configured to calibrate the sound of the real-world venue for a given sound system and for a number of locations within the venue. In that manner, sound characteristics can be determined for any location within the real-world venue.

The sound localizer includes a live view coordinator 758 that is configured to manage the delivery of a data to the remote user. In particular, the coordinator 758 manages deliveries of the live view that is augmented of the real-word venue to the HMD of the remote user. As such, the remote user may be viewing the real-world venue to gain an augmented reality experience.

A gaming session may be established and managed by a game session manager 751 in association with one or more game plays of one or more users playing a gaming application (e.g., professional gamers participating in an eSports event featuring simultaneous game plays of a multi-player gaming application). The multi-player gaming session may be established and managed by any of the components of CPU 702, the cloud gaming provider 112 of FIG. 2, or any combination thereof. In particular, session manager 751 is configured to access and/or manage game state for the game session. Session manager may execute the game code of the gaming application, or may instruct a game execution engine to execute the game code. Game session manager 751 and/or a game execution engine may be located at the cloud gaming provider 112 of FIG. 2. In particular, game session manager 758 may include a game execution engine to deliver and obtain user input commands that are used to influence the outcome of a corresponding game play. Input commands may be transmitted from user device to game session manager 751, and are used to drive game play.

The sound localizer 750 may include an audio capture manager 752 that is configured to capture and/or generate the audio corresponding to the live event. For example, audio may include audio from one or more broadcasters at the live event. When the live event is an eSports event, the broadcasters are tasked with bringing the audience along for the ride by providing play-by-play commentary of the game play of a multi-player gaming session conducted by professional gamers. In addition, the audio may be associated with the multi-player gaming session, wherein the capture manager 752 is able to capture the audio directly from the gaming engine that is executing the gaming application in support of the gaming session. That is, instead of capturing the audio related to the gaming session through audio recorders, the audio may be captured as it is streamed from the gaming engine.

The sound localizer 750 includes an audio localization module 754 that is configured to generate audio in association with the live view that is augmented. The live view is generated for a particular location within the real-world venue, such that that live view is generated from the standpoint of that location, to include generating audio that is localized for that location. That is, a unique audio signal may be generated based on the location from which the corresponding view was generated. The audio localization module 754 is able to modify captured audio to reflect the real-world sound characteristics of the selected location within the real-world venue.

The sound localizer 750 includes an audio and live view synchronizer 753 that is configured to synchronize the live view and the modified audio, wherein the live view is generated for a particular location within the real-world venue, and wherein the audio is modified to reflect the sound characteristics for the location of the real-world venue from which the live view is generated.

The sound localizer includes a sound source distance calculator 755 that is configured for determining the distance to a sound origin. For example, when two avatars representing two remote users are communicating with each other within corresponding live views in the virtualized venue, the distance calculator is able to determine the distance between the two avatars. That is, a live view for one remote user may include the avatar of the second remote user. For example, the avatars may be separated by a large distance. A communication pairing module 756 is configured to create a communication channel between devices associated with the remote users controlling the avatars. For instance, the devices may be head mounted displays (HMDs). In that manner, the remote users may receive audio that is independent of the audio being generated from the live event. As such, the sound from one avatar that is received by the other avatar is modified to be consistent with the space between the two avatars (e.g., distance). For example, a delay in the sound may be induced by the distance.

Figure 8:
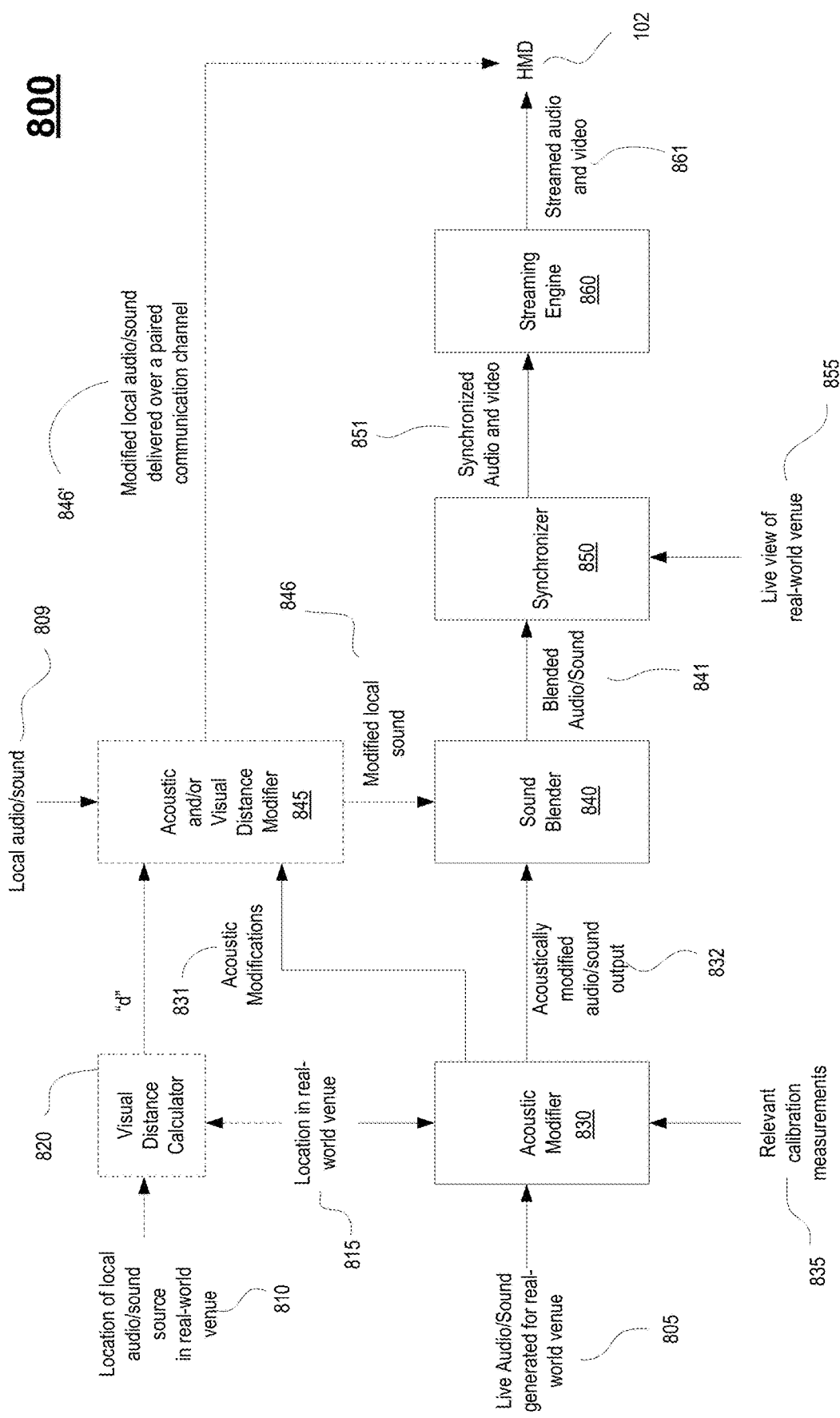
FIG. 8 is a data flow diagram illustrating the operations performed when localizing audio generated for a live event to a particular viewing location in a real-world venue holding the live event, wherein the localized audio is provided with a live view of the real-world venue to give a remote user an augmented reality view of the live event, in accordance with one embodiment of the present disclosure.

FIG. 8 is a data flow diagram illustrating the operations performed when localizing audio generated for a live event to a particular viewing location in a real-world venue holding the live event, in accordance with one embodiment of the present disclosure. In particular, the localized audio is provided with a live view of the real-world venue to give a remote user an augmented reality view of the live event including audio that is consistent with the audio experienced in the real-world venue for the selected viewing location, in accordance with one embodiment of the present disclosure.

For example, the live event may be an eSports event that is featuring a multi-player gaming session. The live event has live audio/sound 805 that is generated for the real-world venue. Using the eSports event as an illustration, the live audio may include the play-by-play commentary of the broadcasters, and the audio being generated from the multi-player gaming session. In particular, the real-world venue may include one or more displays that show the game play of one or more players in the multi-player gaming session. As the video is shown on the displays, the broadcasters may provide play-by-play commentary of the displayed video. As such, the audience is able to hear both the game play corresponding to what is being displayed as well as the play-by-play commentary. Both sounds are generated from different sources. Throughout this specification, the terms "sound" and "audio" are intended to be interchangeable.

In particular, acoustic modifier 830 is configured to modify the audio/sound generated for the live view to reflect the sound characteristics associated with and perceived by the location from which the live view is generated. As such, the acoustic modifier receives as input the live audio 805 that is generated for the real-world venue. For example, the live audio may be also broadcast over the sound system of the real world venue. The live audio 805 is modified based on the selected location 815 (e.g., the location in the real world venue from which the live that is augmented is generated), and the calibration measurements 835 that are relevant for that location. Calibration measurements may be determined for a given set of locations within the real-world venue when performing a calibration process to determine sound characteristics of the real world venue. The calibration process may include broadcasting a sound pattern over a sound system (e.g., sound sources located throughout the venue), and measuring sound responses at different locations within the venue. For example, the calibration measurements may be taken at every seat in the venue, or at a smaller subset of seats. Calibration measurements for any point in the venue may be determined by interpolating calibration measurements that are relevant (e.g., nearby), or through any other technique, such as taking the nearest measurements, etc. As such, the location 815 and the relevant calibration measurements 835 are also input into the acoustic modifier 830 to determine the sound characteristics for that location, and to apply corresponding acoustic modifications to the live audio 805 to generate acoustically modified audio 832 as output.

Optionally, local audio 809 may also be generated. For example, a first remote user may have within his or her live view an avatar representing a second remote user. In addition, the two remote users may be communicating with each other, such that the first remote user will receive audio/sound from the second remote user. The avatars of the first and second remote users are separated by a distance, which may be relevant in modifying the audio of the second remote user (as received by the first remote user) to reflect that distance. As such, the visual distance calculator 820 receives as input the location of the first remote user 815 in the real-world venue (where the live view is generated, and where the avatar of the first remote user is positioned within augmented reality). The visual distance calculator 820 also receives the location 810 of the local sound source, such as the location of the avatar representing the second remote user. Based on the two locations 810 and 815 in the real-world venue, the visual distance calculator 820 can determine a distance "d" that separates the two locations (and the two avatars representing the remote users). The distance "d" is input into the acoustic and/or visual distance modifier 845 that is configured to modify the local sound 809 based on, in part, the distance "d" and/or the acoustic modifications that may be applied to audio/sound heard at the location 815 of the live view generated for the first remote user. The acoustically modified local audio output 846 is modified to reflect the sound characteristics of the selected location 815 and/or the distance "d".

In one embodiment, this modified local audio 846 can be blended with the acoustically modified audio 832 (generated for the live event and modified to reflect sound characteristics of the location 815 from which the live view is generated) in sound blender 840. That is, blended audio 841 is generated by sound blender 840. In another embodiment, the acoustically modified local audio 846' is delivered to the HMD 102 of the first remote user over a dedicated communication channel that pairs the first and second remote users. That is, the communication between the two remote users occurs independently of the sound generated in association with the live event. In this case, the sound bender 840 outputs only the acoustically modified audio 832.

Synchronizer 850 receives as input the blended audio 841 and the live view of the real-world venue 855. Synchronizer 850 is configured to synchronize the blended audio 841 with the live view 855 that is generated for the first remote user for a selected location within the real-world venue. The output is the synchronized audio and video 851. The synchronized live view and blended audio 851 is then streamed as streaming data 861 by the streaming engine 860 to the HMD 102.

Figure 9:
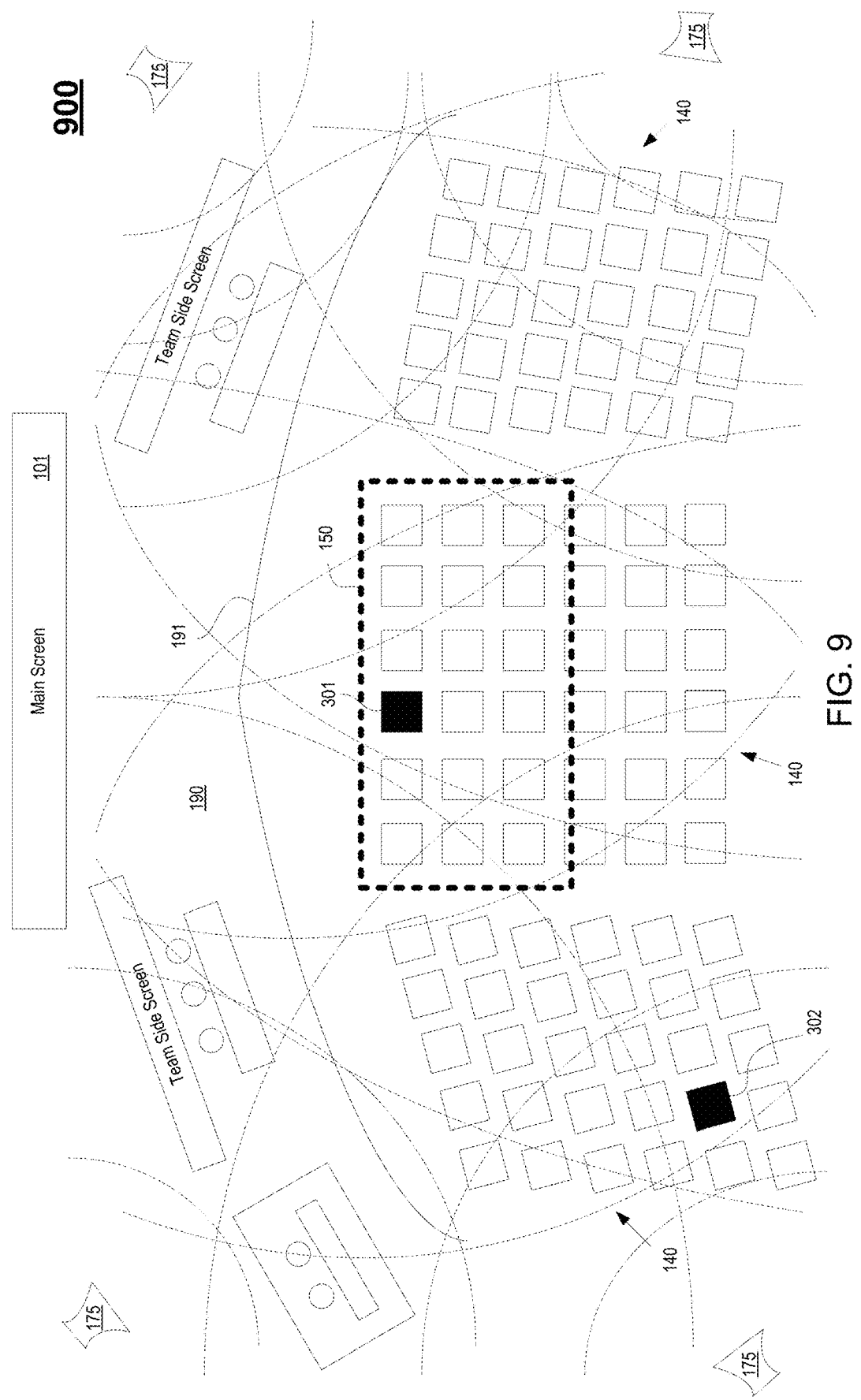
FIG. 9 is an illustration of the sound patterns generated within a real-world venue from audio broadcasted over a plurality of audio sources (e.g., speakers) which results in different audio characteristics experienced at different locations in the real-world venue, in accordance with one embodiment of the present disclosure.

FIG. 9 is an illustration of the sound patterns 900 generated within a real-world venue from audio broadcasted over a plurality of audio sources (e.g., speakers) which results in different audio characteristics experienced at different locations in the real-world venue, in accordance with one embodiment of the present disclosure. For example, the real-world venue may be the eSports arena 100 of FIG. 1A, which includes the front 191 of the stage 190, wherein the venue is showcasing a live eSports event, such as a video gaming competition, in accordance with one embodiment of the present disclosure. The eSports arena 100 includes arena seating 140, wherein live audience members may be seated within arena seating 140, and participate in the live event as members of a live audience. In addition, remote users may elect to sit in one of the seats of arena seating and participate in the live event through a live view that is generated for that selected seat, as previously described. For example, a live view may be generated for seat 301 located in VIP section 150, and another live view may be generated for seat 302, located at the back of the arena seating 140.

Speakers 175 are part of a sound system for the real-world venue. The sound system may be configured to broadcast audio that is generated for the live event. For instance, the audio may include audio from one or more broadcasters, or from the game plays of players participating in a multi-player gaming session.

As shown in FIG. 9, speakers 175 generate sound patterns that are reflected and refracted throughout the real-world venue. The sound patterns from the speakers combined illustrate the general sound pattern 900 of the venue from the speakers 175 of the arena sound system. The sound pattern 900 will generate different sound characteristics for different locations within the venue. That is, the sound experienced at seat 301 near the front of the venue will be different than the sound experienced at seat 302. Without going into details, the broadcasted sound will be different at different locations, in part, because the received sound at a first location (e.g., seat 301) will go through different reflection and refraction and interference patterns than the received sound at a second location (e.g., seat 302).

A sound calibration process may be performed to determine sound characteristics for measured locations (where calibration measurements are taken) within the venue. Sound characteristics may include timing characteristics, reflection characteristics, refraction characteristics, interference characteristics, and attenuation characteristics. For example, the calibration process for each location tested an audio test pattern may be broadcast over the sound system of the real-world venue. That is, the test pattern is broadcast over sound sources at a plurality of locations in the venue, wherein the sound sources could be speakers of the sound system. Calibration measurements are determined at each of the test locations. That is, measured audio signals are received and captured during the broadcast of the audio test pattern. Those calibration measurements for specific test locations in the venue may canvas every possible location of interest (e.g., every seat in the venue), in one embodiment. In that manner, the calibration measurements taken at a specific location can be used without consideration of other calibration measurements. That is, those calibration measurements are localized for that given location. For example, for a given seat, localized calibration measurements taken during testing for that particular seat are used.

In another implementation, the calibration measurements (measured at specific testing locations in the real-world venue) may be used to determine calibration measurements at locations where no measurements were taken during the calibration process. For example, for a given location, relevant calibration measurements (e.g., a small subset of calibration measurements taken at nearby locations) may be used to determine (e.g., through interpolation) localized calibration measurements for that given location. The localized calibration measurements are reflective of the sound characteristics of that given location.

Once the calibration measurements are determined, acoustic modifications may be determined for that given location, wherein the acoustic modification are based on and/or reflective of the sound characteristics as represented by the localized calibration measurements. In addition, the acoustic modifications are applied to captured, generated, and/or blended audio to reflect the sound characteristics for that given location.

Figure 10:
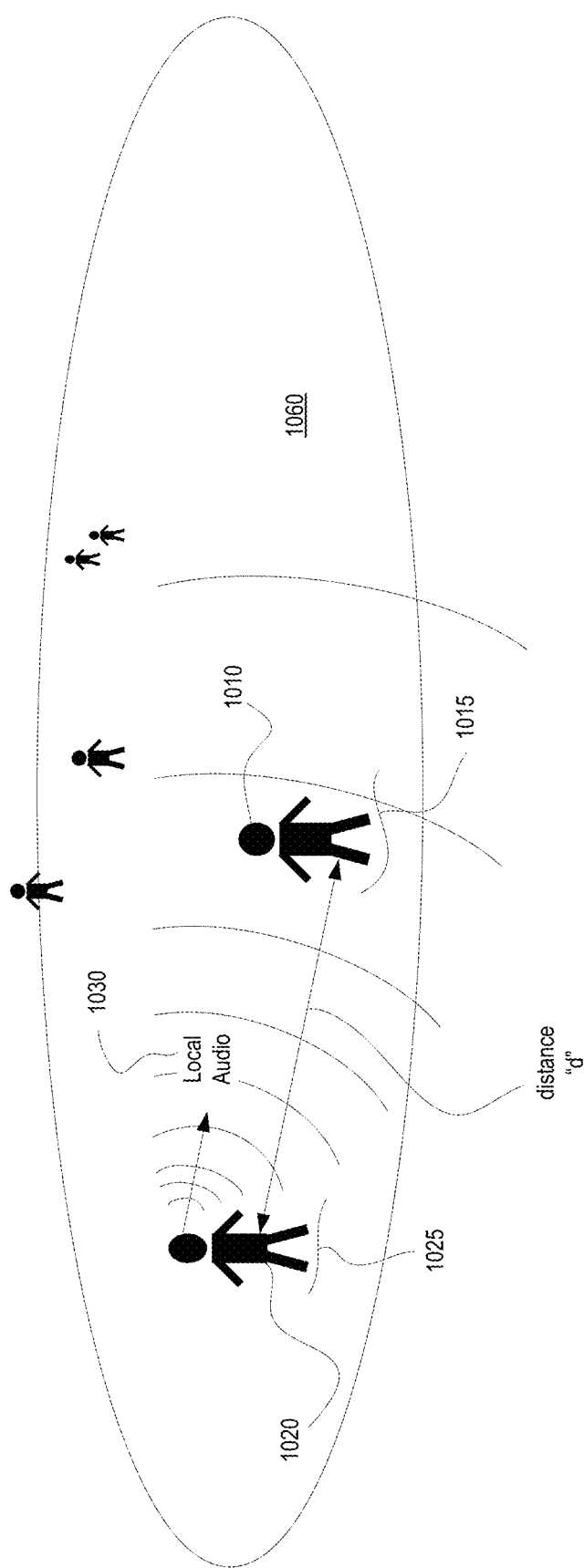
FIG. 10 is an illustration of an interaction between two avatars within an augmented reality version of a real-world venue, the two avatars representing two remote users participating in two different augmented reality views of the live event, wherein communication between the two avatars is modified to reflect acoustics of the real-world venue that may be influenced by the distance between the two avatars in the real-world venue, in accordance with one embodiment of the disclosure.

FIG. 10 is an illustration of an interaction between two avatars within an augmented reality version of a real-world venue, the two avatars representing two remote users participating in two different augmented reality views of the live event, wherein communication between the two avatars is modified to reflect acoustics of the real-world venue that may be influenced by the distance between the two avatars in the real-world venue, in accordance with one embodiment of the disclosure. In particular, a representation of the real-world venue is represented by a virtualized space 1060. For instance, space 1060 may be the arena seating 140 of the eSports arena.

In the virtual space 1060, avatars 1010 and 1020 may be seated near to each other, though not necessarily next to each other. Avatar 1010 may represent first remote user receiving a first live view of the event generated for a location 1015 in the virtual space 1060 (e.g., a first seat within the venue). Also, avatar 1020 may represent second remote user receiving a second live view of the event generated for a location 1025 in the virtual space 1060 (e.g., a second seat within the venue). A distance "d" separates avatar 1010 and 1020.

In addition, other avatars may be located within the virtual space 1060. For example, these other avatars are shown at larger distances away from avatar 1010 than distance "d", the distance between avatar 1010 and avatar 1020. That is, these other avatars may be seated further away from avatar 1010 than avatar 1020 is seated from avatar 1010.

Avatar 1010 is controlled by the first remote user, wherein the first remote user may generate local audio for avatar 1010. Avatar 1020 is controlled by the second remote user, wherein the second remote user may generate local audio/sound 1030 for avatar 1020. In one embodiment, the two remote users are able to interact with each other through respective live views that are augmented of the live event. That is, the live views for each avatar 1010 and 1020 would each possibly include the other avatar. For example, the live view generated for avatar 1010 may include avatar 1020, and similarly the live view generated for avatar 1020 may include avatar 1010.

In addition, the two avatars 1010 and 1020 may be paired, such as by communication pairing module 756, which is configured to establish a communication channel that pairs the first remote user and the second remote user in order to enable the exchange of communication. For instance, the back-end entertainment server 250 may be configured to establish the communication channel. In that manner, when avatar 1010 and avatar 1020 have engaged in contact, or have somehow expressed interest in communicating with each other (e.g., they are within a threshold distance within which two humans may communicate comfortably or uncomfortably—through yelling), then the communication channel is established and enabled automatically. Just as in the real world, a verbal interaction between two persons may occur without any extensive arrangements.

In addition, the local audio/sound 1030 that is received by avatar 1010 is acoustically modified to reflect the visual distance "d" and/or the sound characteristics of location 1015, as previously described. For example, if the distance "d" is large, then there may be a delay in the local audio with respect to corresponding video showing the avatar 1020 speaking to avatar 1010. The delay would be applied to the local audio 1030, when synchronizing the local audio to the video in the corresponding live view for the avatar 1010.

Figure 11:
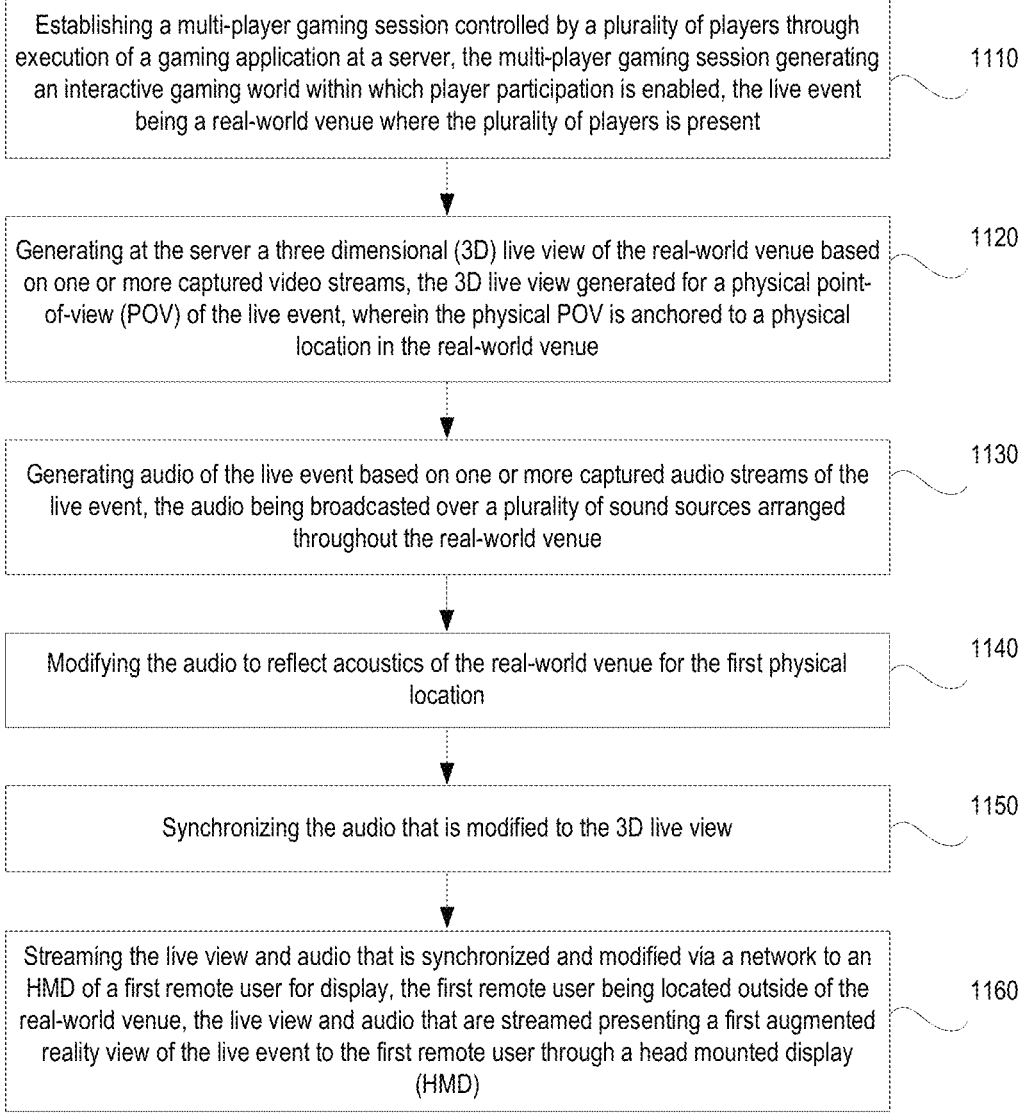
FIG. 11 is a flow diagram illustrating a method for localizing audio generated for a live event to a particular viewing location in a real-world venue holding the live event, in accordance with one embodiment of the present disclosure.

With the detailed description of the various modules of the sound localizer configured to localize audio/sound that is generated for a live view that is augmented of a live event to reflect the sound characteristics of the selected position within the real-world venue, a method for localizing audio generated for a live event to a particular viewing location in a real-world venue holding the live event is now described in relation to flow diagram 1100 of FIG. 11, in accordance with one embodiment of the present disclosure. The method outlined in flow diagram 1100 is implemented by one or more systems and/or components of FIGS. 2A-2B and FIGS. 7A-7B in embodiments.

The method begins at operation 1110 and includes establishing a multi-player gaming session controlled by a plurality of players through execution of a gaming application at a server. That is, the players are playing the gaming application through the gaming session through the execution of a gaming application in association with a live event held in a real-world venue (e.g., one or more professional gamers may be playing the gaming application within the gaming session). The multi-player gaming session generates an interactive gaming world within which player participation is enabled. The live event being a real-world venue where the plurality of players are present. A live audience is attending the live event in the real-world venue, and many more remote users can also participate in the live event as virtual attendees or participants, as previously described. For example, the live event may be an eSports event held in an arena, as previously described. In another example, the live event may be a sporting event held in an arena or stadium. Other live events are contemplated, such as theater shows, music concerts, etc. The gaming session may be created and managed at a server, such as a cloud based gaming server, or entertainment server configured for generating live, hybrid, and/or augmented reality views into the real-world venue showing the gaming session.

At 1120, the method includes generating at the server a three dimensional (3D) live view of the real-world venue based on one or more captured video streams. The 3D live view is generated for a physical point-of-view (POV) of the live event, wherein the physical POV is anchored to a physical location in the real-world venue. In particular, the captured video streams are captured from one or more video capture devices within the real-world venue. Based on one or more of the captured video streams, live, hybrid, and/or augmented reality views of the real-world venue may also be generated. That is, for every location in the real-world venue, a view into the venue may be generated using a subset of the video streams being captured. As such, a first subset of video streams may be used to generate a first view into the venue from a first seat, and a second subset of video streams may be used to generate a second view into the venue from a second seat. The views may be live, hybrid, and/or augmented reality views into the real-world venue. For example, for the first view the views may be generated by stitching the video frames from the first subset of captured video streams.

At 1130, the method includes generating audio of the live event based on one or more captured audio streams of the live event, the audio being broadcasted over a plurality of sound sources arranged throughout the real-world venue. The audio may be captured at the generating source. For example, audio associated with the multi-player gaming session may be captured directly from the gaming engine or server that is executing the gaming application, and before being broadcast over the sound system of the real-world venue. In other implementations, audio may be captured using audio recorders configured to record audio that is broadcast over the sound system.

At 1140, the method includes modifying the audio to reflect acoustics of the real-world venue for the first physical location. In particular, each location in the real-world venue has unique sound characteristics. As such, even though the same audio or sound is broadcast over the sound system of the real-world venue, the audio received a first location in the venue will be different from the audio received at a second location because of the differing sound characteristics. Briefly, sound waves reaching the first location will be different from sound waves that reach the second location even though the broadcasted sound originates from the same sound system. This may be due to timing delays, reflection, refraction, interference, and/or attenuation influences on the broadcasted sound. As such, each location in the venue has a unique sound characteristic or acoustics. The sound characteristics may include timing characteristics, reflection characteristics, refraction characteristics, interference characteristics, and attenuation characteristics.

In one embodiment, a calibration process is performed to determine the sound characteristics for different locations in the real-world venue, as previously described. The sound characteristics are unique for a given location in the venue and for a plurality of locations of sound sources in the venue (e.g., the sound system). The calibration process may include broadcasting an audio test pattern from the plurality of locations of sound sources, and measuring audio signals received from the test pattern at a plurality of test locations in the venue. Calibration measurements may be determined for each of the test locations.

Calibration measurements may be determined for locations in the venue other than the test locations, such as through interpolation, or association with the calibration measurements of the nearest test location, or through any other matching technique. For example, using interpolation, localized calibration measurements may be determined for a first physical location that corresponds to a first physical POV in the real-world venue (e.g., a first seat), wherein the interpolation is performed on a first set of test locations that is relevant to the first physical location.

Acoustic modifications are generated for the calibration measurements (i.e., the sound characteristics) determined or associated with a particular location. Those acoustic modifications are applied to the captured audio. That is, at 1140 the captured audio is modified to reflect the sound characteristics or acoustics experienced at the particular location in the real world venue. In that manner, the audio being generated for the live view is localized for the physical POV to reflect the sound characteristics of that location of the physical POV within the venue from which the live view is generated. As such, audio being generated for and experienced at a particular physical location within the real-world venue would sound different than the audio being experienced at another location. For example, a first location that is close to the stage of the venue and a large cluster of stage speakers would sound different than a location that is remote from the stage. In general, for a particular location, far away sounds would be diminished, and nearer sounds within the venue would be amplified for the physical POV.

At 1150, the method includes synchronizing the audio that is modified to the 3D live view. That is, the live view is aligned with the localized audio. In that manner, a remote user viewing the live view corresponding to a physical location in the venue (e.g., through an HMD) will have the same experience as if he or she were physically at the real-world venue in the same location.

At 1160, the method includes streaming the 3D live view and the audio that is synchronized and modified via a network from the server to an HMD of a first remote user for display. The first remote user is located outside of the real-world venue, such as within the living room of a home of the user. The user may even be located in a different block, city, county, state, and/or country. That is, the first remote user is not physically attending the live event at the real-world venue, but may through embodiments of the present invention virtually attend the live event through live, hybrid, and/or augmented realty views into the real-world venue. Specifically, the 3D live view presents an augmented reality view of the live event to the first remote user through a head mounted display (HMD). As previously described, the live view is generated for a specific location in a real-world venue holding the live event, and is based on one or more video and audio recordings collected from one or more locations in the venue.

In one embodiment, the live view generated for the first remote user may include another participant, i.e., a second remote user, wherein the second remote user is participating in a second augmented reality view of the live event through a respective HMD. The second augmented reality view being generated from and/or for a second physical POV of a second physical location in the real-world venue. The first remote user and the second remote user may be communicating with each other. For example, local audio from the second remote user may be received, such as audio related to communication from the second remote user to the first remote user).

The local audio associated with the second remote user is modified to reflect acoustics of the real-world venue for the first physical location (e.g., the first POV of the first remote user). In addition, the modification of the local audio may be based on the first physical location and the second physical location. For example, the distance between the two remote users as they participate in the live event from different locations in the venue (e.g., two different seats) may be determined and considered. That is, a delay in the transmission or delivery of the local audio due to distance may be considered when modifying the local audio. As such, the delay is applied to the local audio when modifying the local audio. In that manner, the local audio is aligned through synchronization with a representation of the second remote user in the live view presented to the first remote user.

In one embodiment, the local audio that is acoustically modified is blended into and/or with the audio of the live event (e.g., the synchronized and modified captured audio). In another embodiment, the local audio that is acoustically modified is delivered over a separate communication channel In particular, the first remote user and the second remote user are paired over a communication channel. The local audio is modified to reflect sound characteristics and any delay due to distance between representations of the two remote users in the venue, and the local audio is delivered to be synchronized with the live view.

Figure 12:
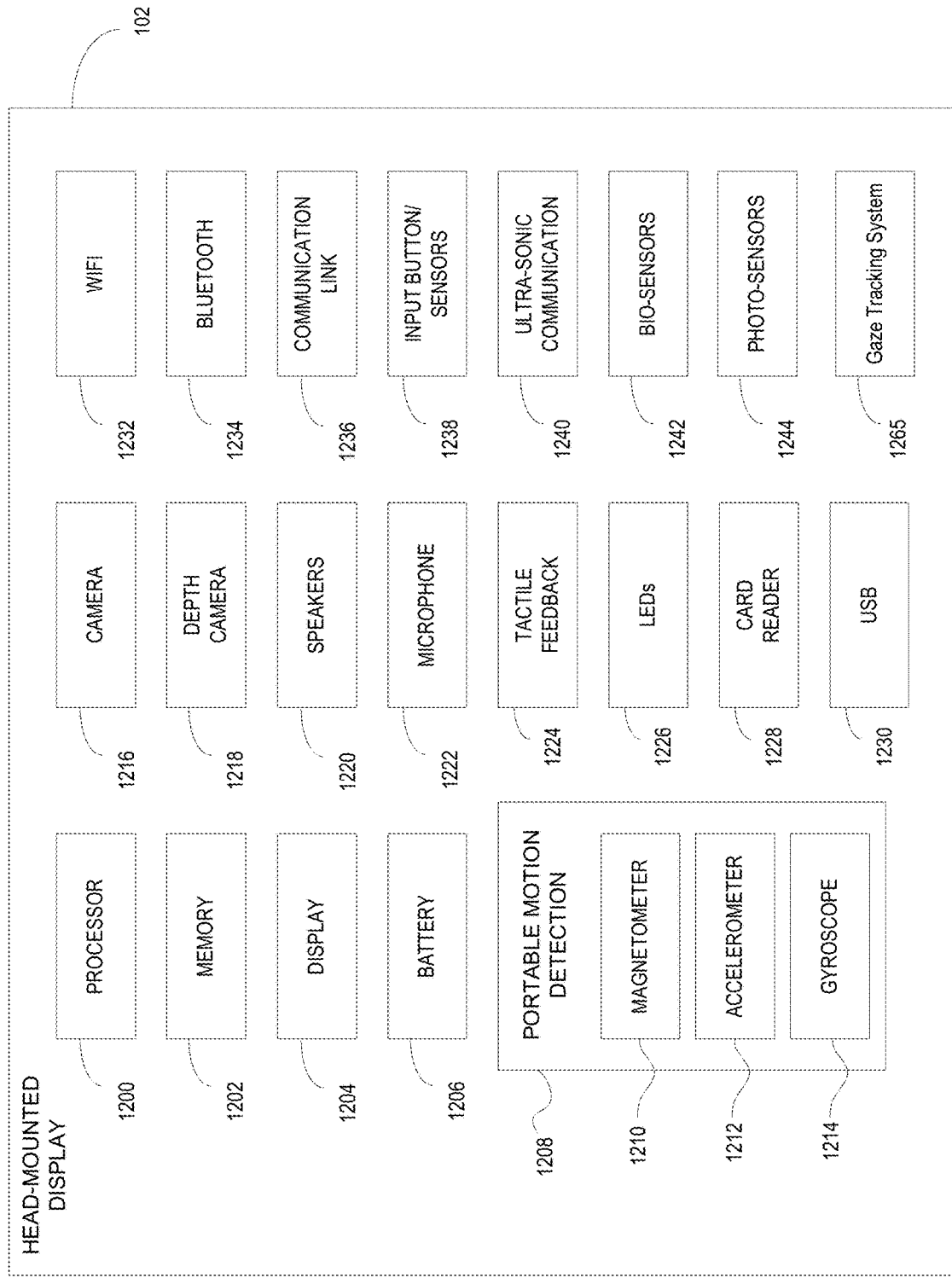
FIG. 12 is a diagram illustrating components of a head-mounted display, in accordance with an embodiment of the disclosure.

FIG. 12, a diagram illustrating components of a head-mounted display 102 is shown, in accordance with an embodiment of the disclosure. The head-mounted display 102 includes a processor 1200 for executing program instructions. A memory 1202 is provided for storage purposes, and may include both volatile and non-volatile memory. A display 1204 is included which provides a visual interface that a user may view. A battery 1206 is provided as a power source for the head-mounted display 102. A motion detection module 1208 may include any of various kinds of motion sensitive hardware, such as a magnetometer 1210, an accelerometer 1212, and a gyroscope 1214.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1212 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1210 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1212 is used together with magnetometer 1210 to obtain the inclination and azimuth of the head-mounted display 102.

A gyroscope is a device for measuring or maintaining orientation, based on the principles of angular momentum. In one embodiment, three gyroscopes 1214 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1216 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1218 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 1220 for providing audio output. Also, a microphone 1222 may be included for capturing audio from the real environment, including sounds from the ambient environment, speech made by the user, etc. The head-mounted display 102 includes tactile feedback module 1224 for providing tactile feedback to the user. In one embodiment, the tactile feedback module 1224 is capable of causing movement and/or vibration of the head-mounted display 102 so as to provide tactile feedback to the user.

LEDs 1226 are provided as visual indicators of statuses of the head-mounted display 102. For example, an LED may indicate battery level, power on, etc. A card reader 1228 is provided to enable the head-mounted display 102 to read and write information to and from a memory card. A USB interface 1230 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 1232 is included for enabling connection to the Internet via wireless networking technologies. Also, the head-mounted display 102 includes a Bluetooth module 1234 for enabling wireless connection to other devices. A communications link 1236 may also be included for connection to other devices. In one embodiment, the communications link 1236 utilizes infrared transmission for wireless communication. In other embodiments, the communications link 1236 may utilize any of various wireless or wired transmission protocols for communication with other devices.

Input buttons/sensors 1238 are included to provide an input interface for the user. Any of various kinds of input interfaces may be included, such as buttons, touchpad, joystick, trackball, etc. An ultra-sonic communication module 1240 may be included in head-mounted display 102 for facilitating communication with other devices via ultra-sonic technologies.

Bio-sensors 1242 are included to enable detection of physiological data from a user. In one embodiment, the bio-sensors 1242 include one or more dry electrodes for detecting bio-electric signals of the user through the user's skin.

Photo-sensors 1244 are included to respond to signals from emitters (e.g., infrared base stations) placed in a 3-dimensional physical environment. The gaming console analyzes the information from the photo-sensors 1244 and emitters to determine position and orientation information related to the head-mounted display 102.

In addition, gaze tracking system 1265 is included and configured to enable tracking of the gaze of the user. For example, system 1265 may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 13:
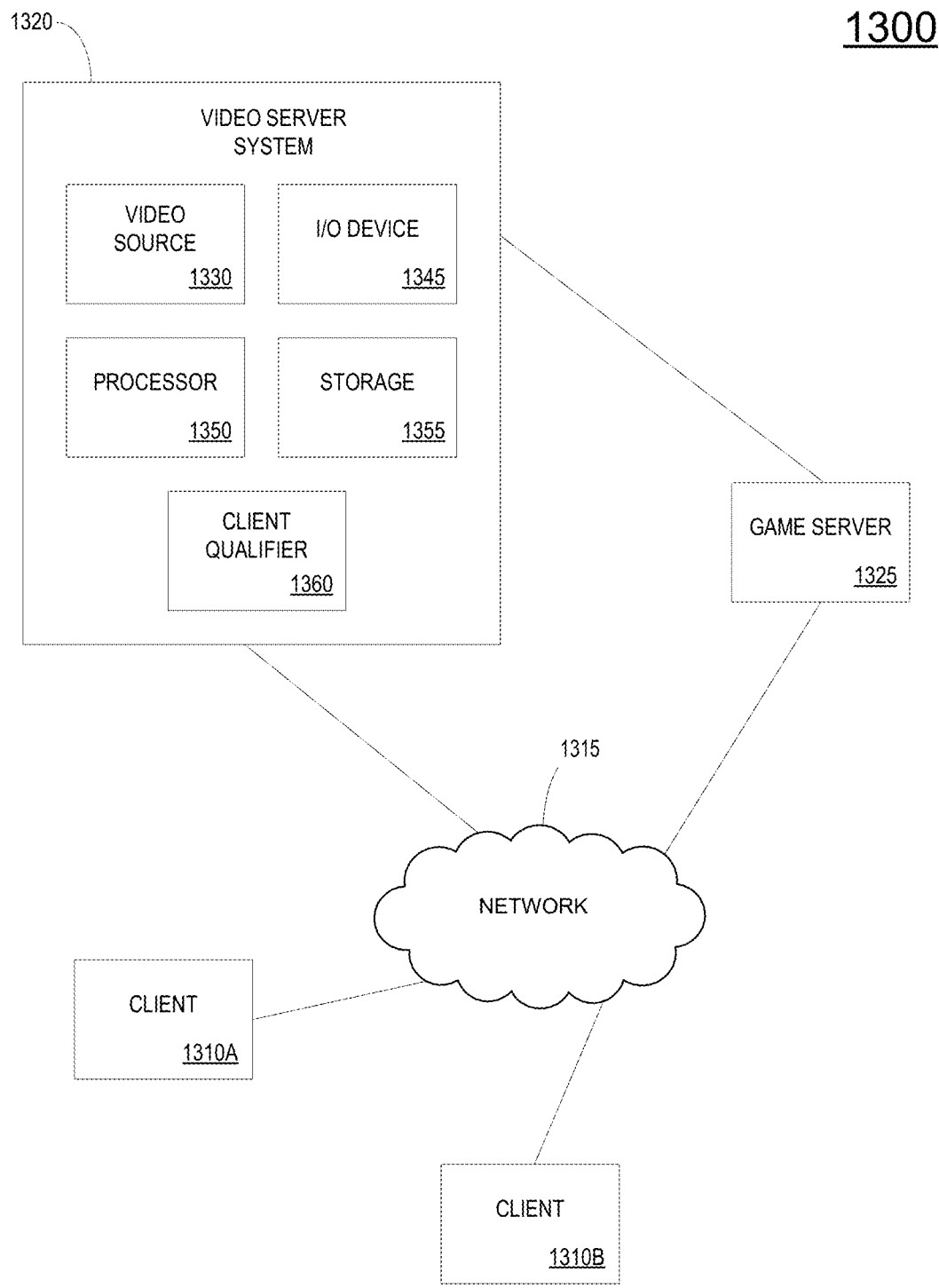
FIG. 13 is a block diagram of a Game System, according to various embodiments of the disclosure.

FIG. 13 is a block diagram of a Game System 1300, according to various embodiments of the disclosure. Game System 1300 is configured to provide a video stream to one or more Clients 1310 via a Network 1315, such as in a single-player mode or multi-player mode. Game system 1300 is analogous to cloud gaming provider 112, in embodiments. Game System 1300 typically includes a Video Server System 1320 and an optional game server 1325. Video Server System 1320 is configured to provide the video stream to the one or more Clients 1310 with a minimal quality of service. For example, Video Server System 1320 may receive a game command that changes the state of or a point of view within a video game, and provide Clients 1310 with an updated video stream reflecting this change in state with minimal lag time. The Video Server System 1320 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 1310, referred to herein individually as 1310A., 1310B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1310 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1310 or on a separate device such as a monitor or television. Clients 1310 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1310 are optionally geographically dispersed. The number of clients included in Game System 1300 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1320 to deliver a game viewed through the HMD. In one embodiment, the game console receives the video stream from the video server system 1320, and the game console forwards the video stream, or updates to the video stream, to the HMD for rendering.

Clients 1310 are configured to receive video streams via Network 1315. Network 1315 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1310 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1310 may, but are not required to, further include systems configured for modifying received video. For example, a client may be configured to perform further rendering, to overlay one video image on another video image, to crop a video image, and/or the like. For example, Clients 1310 may be configured to receive various types of video frames, such as I-frames, P-frames and B-frames, and to process these frames into images for display to a user. In some embodiments, a member of Clients 1310 is configured to perform further rendering, shading, conversion to 3-D, or like operations on the video stream. A member of Clients 1310 is optionally configured to receive more than one audio or video stream. Input devices of Clients 1310 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1310 is generated and provided by Video Server System 1320. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1310 are typically configured to receive inputs from a user. These inputs may include game commands configured to change the state of the video game or otherwise affect gameplay. The game commands can be received using input devices and/or may be automatically generated by computing instructions executing on Clients 1310. The received game commands are communicated from Clients 1310 via Network 1315 to Video Server System 1320 and/or Game Server 1325. For example, in some embodiments, the game commands are communicated to Game Server 1325 via Video Server System 1320. In some embodiments, separate copies of the game commands are communicated from Clients 1310 to Game Server 1325 and Video Server System 1320. The communication of game commands is optionally dependent on the identity of the command Game commands are optionally communicated from Client 1310A through a different route or communication channel that that used to provide audio or video streams to Client 1310A.

Game Server 1325 is optionally operated by a different entity than Video Server System 1320. For example, Game Server 1325 may be operated by the publisher of a multiplayer game. In this example, Video Server System 1320 is optionally viewed as a client by Game Server 1325 and optionally configured to appear from the point of view of Game Server 1325 to be a prior art client executing a prior art game engine. Communication between Video Server System 1320 and Game Server 1325 optionally occurs via Network 1315. As such, Game Server 1325 can be a prior art multiplayer game server that sends game state information to multiple clients, one of which is game server system 1320. Video Server System 1320 may be configured to communicate with multiple instances of Game Server 1325 at the same time. For example, Video Server System 1320 can be configured to provide a plurality of different video games to different users. Each of these different video games may be supported by a different Game Server 1325 and/or published by different entities. In some embodiments, several geographically distributed instances of Video Server System 1320 are configured to provide game video to a plurality of different users. Each of these instances of Video Server System 1320 may be in communication with the same instance of Game Server 1325. Communication between Video Server System 1320 and one or more Game Server 1325 optionally occurs via a dedicated communication channel. For example, Video Server System 1320 may be connected to Game Server 1325 via a high bandwidth channel that is dedicated to communication between these two systems.

Video Server System 1320 comprises at least a Video Source 1330, an I/O Device 1345, a Processor 1350, and non-transitory Storage 1355. Video Server System 1320 may include one computing device or be distributed among a plurality of computing devices. These computing devices are optionally connected via a communications system such as a local area network.

Video Source 1330 is configured to provide a video stream, e.g., streaming video or a series of video frames that form a moving picture. In some embodiments, Video Source 1330 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 1325. Game Server 1325 may maintain a copy of the state of the game based on game commands received from multiple players using geographically disperse clients. In these cases, the game state is provided by Game Server 1325 to Video Source 1330, wherein a copy of the game state is stored and rendering is performed. Game Server 1325 may receive game commands directly from Clients 1310 via Network 1315, and/or may receive game commands via Video Server System 1320.

Video Source 1330 typically includes rendering logic, e.g., hardware, firmware, and/or software stored on a computer readable medium such as Storage 1355. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1310. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1330 includes a video recording device such as a camera. This camera may be used to generate delayed or live video that can be included in the video stream of a computer game. The resulting video stream optionally includes both rendered images and images recorded using a still or video camera. Video Source 1330 may also include storage devices configured to store previously recorded video to be included in a video stream. Video Source 1330 may also include motion or positioning sensing devices configured to detect motion or position of an object, e.g., person, and logic configured to determine a game state or produce video-based on the detected motion and/or position.

Video Source 1330 is optionally configured to provide overlays configured to be placed on other video. For example, these overlays may include a command interface, log in instructions, messages to a game player, images of other game players, video feeds of other game players (e.g., webcam video). In embodiments of Client 1310A including a touch screen interface or a gaze detection interface, the overlay may include a virtual keyboard, joystick, touch pad, and/or the like. In one example of an overlay a player's voice is overlaid on an audio stream. Video Source 1330 optionally further includes one or more audio sources.

In embodiments wherein Video Server System 1320 is configured to maintain the game state based on input from more than one player, each player may have a different point of view comprising a position and direction of view. Video Source 1330 is optionally configured to provide a separate video stream for each player based on their point of view. Further, Video Source 1330 may be configured to provide a different frame size, frame data size, and/or encoding to each of Client 1310. Video Source 1330 is optionally configured to provide 3-D video.

I/O Device 1345 is configured for Video Server System 1320 to send and/or receive information such as video, commands, requests for information, a game state, gaze information, device motion, device location, user motion, client identities, player identities, game commands, security information, audio, and/or the like. I/O Device 1345 typically includes communication hardware such as a network card or modem. I/O Device 1345 is configured to communicate with Game Server 1325, Network 1315, and/or Clients 1310.

Processor 1350 is configured to execute logic, e.g. software, included within the various components of Video Server System 1320 discussed herein. For example, Processor 1350 may be programmed with software instructions in order to perform the functions of Video Source 1330, Game Server 1325, and/or a Client Qualifier 1360. Video Server System 1320 optionally includes more than one instance of Processor 1350. Processor 1350 may also be programmed with software instructions in order to execute commands received by Video Server System 1320, or to coordinate the operation of the various elements of Game System 1300 discussed herein. Processor 1350 may include one or more hardware device. Processor 1350 is an electronic processor.

Storage 1355 includes non-transitory analog and/or digital storage devices. For example, Storage 1355 may include an analog storage device configured to store video frames. Storage 1355 may include a computer readable digital storage, e.g., a hard drive, an optical drive, or solid state storage. Storage 1355 is configured (e.g., by way of an appropriate data structure or file system) to store video frames, artificial frames, a video stream including both video frames and artificial frames, audio frame, an audio stream, and/or the like. Storage 1355 is optionally distributed among a plurality of devices. In some embodiments, Storage 1355 is configured to store the software components of Video Source 1330 discussed elsewhere herein. These components may be stored in a format ready to be provisioned when needed.

Video Server System 1320 optionally further comprises Client Qualifier 1360. Client Qualifier 1360 is configured for remotely determining the capabilities of a client, such as Clients 1310A or 1310B. These capabilities can include both the capabilities of Client 1310A itself as well as the capabilities of one or more communication channels between Client 1310A and Video Server System 1320. For example, Client Qualifier 1360 may be configured to test a communication channel through Network 1315.

Client Qualifier 1360 can determine (e.g., discover) the capabilities of Client 1310A manually or automatically. Manual determination includes communicating with a user of Client 1310A and asking the user to provide capabilities. For example, in some embodiments, Client Qualifier 1360 is configured to display images, text, and/or the like within a browser of Client 1310A. In one embodiment, Client 1310A is an HMD that includes a browser. In another embodiment, client 1310A is a game console having a browser, which may be displayed on the HMD. The displayed objects request that the user enter information such as operating system, processor, video decoder type, type of network connection, display resolution, etc., of Client 1310A. The information entered by the user is communicated back to Client Qualifier 1360.

Automatic determination may occur, for example, by execution of an agent on Client 1310A and/or by sending test video to Client 1310A. The agent may comprise computing instructions, such as java script, embedded in a web page or installed as an add-on. The agent is optionally provided by Client Qualifier 1360. In various embodiments, the agent can find out processing power of Client 1310A, decoding and display capabilities of Client 1310A, lag time reliability and bandwidth of communication channels between Client 1310A and Video Server System 1320, a display type of Client 1310A, firewalls present on Client 1310A, hardware of Client 1310A, software executing on Client 1310A, registry entries within Client 1310A, and/or the like.

Client Qualifier 1360 includes hardware, firmware, and/or software stored on a computer readable medium. Client Qualifier 1360 is optionally disposed on a computing device separate from one or more other elements of Video Server System 1320. For example, in some embodiments, Client Qualifier 1360 is configured to determine the characteristics of communication channels between Clients 1310 and more than one instance of Video Server System 1320. In these embodiments the information discovered by Client Qualifier can be used to determine which instance of Video Server System 1320 is best suited for delivery of streaming video to one of Clients 1310.

While specific embodiments have been provided for generating a live view that is augmented with digital data to provide an augmented reality experience of a live event held at a real-world venue, and providing audio generated for the live event that is localized to a particular viewing location in the real-world venue, these are described by way of example and not by way of limitation. Those skilled in the art having read the present disclosure will realize additional embodiments falling within the spirit and scope of the present disclosure.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for localizing sound when enabling participation in a live event, comprising:
    establishing a multi-player gaming session controlled by a plurality of players through execution of a gaming application at a server, the multi-player gaming session generating an interactive gaming world within which player participation is enabled, the live event being a real-world venue where the plurality of players is present;
    generating at the server a three dimensional (3D) live view of the real-world venue based on one or more captured video streams, the 3D live view generated for a first physical point-of-view (POV) of the live event, wherein the first physical POV is anchored to a first physical location in the real-world venue other than where a captured video stream is captured, wherein the first physical location is a seat in the real-world venue where a spectator may be physically present;
    generating audio of the live event based on one or more captured audio streams of the live event, the audio being broadcasted over a plurality of sound sources arranged throughout the real-world venue;
    modifying the audio to reflect acoustics of the real-world venue for the first physical location;
    synchronizing the audio that is modified to the 3D live view;
    streaming the 3D live view and the audio that is synchronized and modified via a network to a head mounted display (HMD) of a first remote user for display, the first remote user being located outside of the real-world venue, the 3D live view and the audio that is synchronized and modified that are streamed presenting a first augmented reality view of the live event to the first remote user through the HMD;
    capturing audio of the first remote user; and
    broadcasting the audio of the first remote user from a speaker located at the seat of the first physical location.

2. The method of claim 1, wherein the modifying the audio includes:
    performing a calibration process to determine sound characteristics of the real-world venue for the first physical location and for a plurality of locations of the plurality of sound sources in the real-world venue;
    generating acoustic modifications based on the sound characteristics; and
    applying the acoustic modifications when performing the modifying the audio.

3. The method of claim 2, wherein the performing the calibration process includes:
    broadcasting an audio test pattern from the plurality of sound sources in the real-world venue;
    measuring audio signals received from the audio test pattern that is broadcasted at a plurality of test locations in the real-world venue;
    determining calibration measurements of the audio signals that are measured for each of the plurality of test locations;
    for the first physical location corresponding to the first physical POV in the real world venue, determining localized calibration measurements for the first physical location through interpolation of first calibration measurements from a first set of test locations relevant to the first physical location; and
    generating the acoustic modifications for the first physical location based on the localized calibration measurements.

4. The method of claim 2, wherein the sound characteristics include timing characteristics, reflection characteristics, refraction characteristics, interference characteristics, and attenuation characteristics.

5. The method of claim 1, further comprising:
    receiving local audio from a second remote user, the second remote user participating in a second augmented reality view of the live event through an HMD of the second remote user, the second augmented reality view generated from a second physical POV of a second physical location in the real-world venue;
    modifying the local audio from the second remote user to reflect the acoustics of the real-world venue for the first physical location and based on the first physical location and the second physical location; and
    blending the local audio that is acoustically modified into the audio of the live event that is synchronized and modified.

6. The method of claim 5, wherein modifying the local audio further comprises:
    determining a distance between the first physical location and the second physical location;

determining a delay in the delivery of the local audio based on the distance; and applying the delay to the local audio, wherein the local audio is aligned with a representation of the second remote user in the 3D live view presented to the first remote user.

7. The method of claim 1, further comprising:
receiving local audio from a second remote user, the second user participating in a second augmented reality view of the live event through an HMD of the second remote user, the second augmented reality view generated from a second physical POV of a second physical location in the real-world venue;
pairing the first remote user and the second remote user over a communication channel;
determining a distance between the first physical location and the second physical location;
determining a delay in the delivery of the local audio based on the distance; and
applying the delay to the local audio delivered over the communication channel, wherein the local audio is aligned with a representation of the second remote user in the 3D live view presented to the first remote user.

8. A non-transitory computer-readable medium storing a computer program for localizing sound when enabling participation in a live event, the non-transitory computer-readable medium comprising:
program instructions for establishing a multi-player gaming session controlled by a plurality of players through execution of a gaming application at a server, the multi-player gaming session generating an interactive gaming world within which player participation is enabled, the live event being a real-world venue where the plurality of players is present;
program instructions for generating at the server a three dimensional (3D) live view of the real-world venue based on one or more captured video streams, the 3D live view generated for a first physical point-of-view (POV) of the live event, wherein the first physical POV is anchored to a first physical location in the real-world venue other than where a captured video stream is captured, wherein the first physical location is a seat in the real-world venue where a spectator may be physically present;
program instructions for generating audio of the live event based on one or more captured audio streams of the live event, the audio being broadcasted over a plurality of sound sources arranged throughout the real-world venue;
program instructions for modifying the audio to reflect acoustics of the real-world venue for the first physical location;
program instructions for synchronizing the audio that is modified to the 3D live view;
program instructions for streaming the 3D live view and the audio that is synchronized and modified via a network to a head mounted display (HMD) of a first remote user for display, the first remote user being located outside of the real-world venue, the 3D live view and the audio that is synchronized and modified that are streamed presenting a first augmented reality view of the live event to the first remote user through the HMD;
program instructions for capturing audio of the first remote user; and program instructions for broadcasting the audio of the first remote user from a speaker located at the seat of the first physical location.

9. The non-transitory computer-readable medium of claim 8, wherein the program instructions for modifying the audio includes:
program instructions for performing a calibration process to determine sound characteristics of the real-world venue for the first physical location and for a plurality of locations of the plurality of sound sources in the real-world venue;
program instructions for generating acoustic modifications based on the sound characteristics; and
program instructions for applying the acoustic modifications when performing the modifying the audio.

10. The non-transitory computer-readable medium of claim 9, wherein the performing the calibration process includes:
program instructions for broadcasting an audio test pattern from the plurality of sound sources in the real-world venue;
program instructions for measuring audio signals received from the audio test pattern that is broadcasted at a plurality of test locations in the real-world venue;
program instructions for determining calibration measurements of the audio signals that are measured for each of the plurality of test locations;
for the first physical location corresponding to the first physical POV in the real world venue, program instructions for determining localized calibration measurements for the first physical location through interpolation of first calibration measurements from a first set of test locations relevant to the first physical location; and
program instructions for generating the acoustic modifications for the first physical location based on the localized calibration measurements.

11. The non-transitory computer-readable medium of claim 9, wherein the sound characteristics include timing characteristics, reflection characteristics, refraction characteristics, interference characteristics, and attenuation characteristics.

12. The non-transitory computer-readable medium of claim 8, further comprising:
program instructions for receiving local audio from a second remote user, the second remote user participating in a second augmented reality view of the live event through an HMD of the second remote user, the second augmented reality view generated from a second physical POV of a second physical location in the real-world venue;
program instructions for modifying the local audio from the second remote user to reflect the acoustics of the real-world venue for the first physical location and based on the first physical location and the second physical location; and
program instructions for blending the local audio that is acoustically modified into the audio of the live event that is synchronized and modified.

13. The non-transitory computer-readable medium of claim 12, wherein program instructions for modifying the local audio further comprises:
program instructions for determining a distance between the first physical location and the second physical location;
program instructions for determining a delay in the delivery of the local audio based on the distance; and program instructions for applying the delay to the local audio, wherein the local audio is aligned with a representation of the second remote user in the 3D live view presented to the first remote user.

14. The non-transitory computer-readable medium of claim 8, further comprising:
program instructions for receiving local audio from a second remote user, the second user participating in a second augmented reality view of the live event through an HMD of the second remote user, the second augmented reality view generated from a second physical POV of a second physical location in the real-world venue;
program instructions for pairing the first remote user and the second remote user over a communication channel;
program instructions for determining a distance between the first physical location and the second physical location;
program instructions for determining a delay in the delivery of the local audio based on the distance; and
program instructions for applying the delay to the local audio delivered over the communication channel, wherein the local audio is aligned with a representation of the second remote user in the 3D live view presented to the first remote user.

15. A computer system comprising:
a processor; and
memory coupled to the processor and having stored therein instructions that, if executed by the computer system, cause the computer system to execute a method for localizing sound when enabling participation in a live event, comprising:
establishing a multi-player gaming session controlled by a plurality of players through execution of a gaming application at a server, the multi-player gaming session generating an interactive gaming world within which player participation is enabled, the live event being a real-world venue where the plurality of players is present;
generating at the server a three dimensional (3D) live view of the real-world venue based on one or more captured video streams, the 3D live view generated for a first physical point-of-view (POV) of the live event, wherein the first physical POV is anchored to a first physical location in the real-world venue other than where a captured video stream is captured, wherein the first physical location is a seat in the real-world venue where a spectator may be physically present;
generating audio of the live event based on one or more captured audio streams of the live event, the audio being broadcasted over a plurality of sound sources arranged throughout the real-world venue;
modifying the audio to reflect acoustics of the real-world venue for the first physical location;
synchronizing the audio that is modified to the 3D live view;
streaming the 3D live view and the audio that is synchronized and modified via a network to a head mounted display (HMD) of a first remote user for display, the first remote user being located outside of the real-world venue, the 3D live view and the audio that is synchronized and modified that are streamed presenting a first augmented reality view of the live event to the first remote user through the HMD:
capturing audio of the first remote user; and
broadcasting the audio of the first remote user from a speaker located at the seat of the first physical location.

16. The computer system of claim 15, wherein the modifying the audio in the method includes:
performing a calibration process to determine sound characteristics of the real-world venue for the first physical location and for a plurality of locations of the plurality of sound sources in the real-world venue;
generating acoustic modifications based on the sound characteristics; and
applying the acoustic modifications when performing the modifying the audio.

17. The computer system of claim 16, wherein the performing the calibration process in the method includes:
broadcasting an audio test pattern from the plurality of sound sources in the real-world venue;
measuring audio signals received from the audio test pattern that is broadcasted at a plurality of test locations in the real-world venue;
determining calibration measurements of the audio signals that are measured for each of the plurality of test locations;
for the first physical location corresponding to the first physical POV in the real world venue, determining localized calibration measurements for the first physical location through interpolation of first calibration measurements from a first set of test locations relevant to the first physical location; and
generating the acoustic modifications for the first physical location based on the localized calibration measurements.

18. The computer system of claim 16, wherein the sound characteristics include timing characteristics, reflection characteristics, refraction characteristics, and attenuation characteristics.

19. The computer system of claim 15, wherein the method further comprises:
receiving local audio from a second remote user, the second remote user participating in a second augmented reality view of the live event through an HMD of the second remote user, the second augmented reality view generated from a second physical POV of a second physical location in the real-world venue;
modifying the local audio from the second remote user to reflect the acoustics of the real-world venue for the first physical location and based on the first physical location and the second physical location; and
blending the local audio that is acoustically modified into the audio of the live event that is synchronized and modified.

20. The computer system of claim 15, wherein the method further comprises:
receiving local audio from a second remote user, the second user participating in a second augmented reality view of the live event through an HMD of the second remote user, the second augmented reality view generated from a second physical POV of a second physical location in the real-world venue;
pairing the first remote user and the second remote user over a communication channel;
determining a distance between the first physical location and the second physical location;
determining a delay in the delivery of the local audio based on the distance; and
applying the delay to the local audio delivered over the communication channel, wherein the local audio is aligned with a representation of the second remote user in the 3D live view presented to the first remote user.

21. A method, comprising:

generating a three dimensional (3D) live view of a real-world venue based on one or more captured video streams, the 3D live view generated for a first physical point-of-view (POV) of a live event conducted in the real-world venue, wherein the first physical POV is anchored to a first physical location in the real-world venue other than where a captured video stream is captured, wherein the first physical location is a seat in the real-world venue where a spectator may be physically present;

generating audio of the live event based on one or more captured audio streams of the live event;

modifying the audio to reflect acoustics of the real-world venue for the first physical location;

synchronizing the audio that is modified to the 3D live view;

streaming the 3D live view and the audio that is synchronized and modified via a network to a device of a first remote user for display, the first remote user being located outside of the real-world venue, the 3D live view and the audio that is synchronized and modified that are streamed presenting a first augmented reality view of the live event to the first remote user through the device:

capturing audio of the first remote user; and broadcasting the audio of the first remote user from a speaker located at the seat of the first physical location.

22. The method of claim 21, wherein the modifying the audio includes:

performing a calibration process to determine sound characteristics of the real-world venue for the first physical location and for a plurality of locations in the real-world venue;

generating acoustic modifications based on the sound characteristics; and applying the acoustic modifications when modifying the audio.

23. The method of claim 22, wherein the sound characteristics include timing characteristics, reflection characteristics, refraction characteristics, interference characteristics, and attenuation characteristics.

* * * * *